United States Patent [19]

Ryang et al.

[11] Patent Number: 5,962,608
[45] Date of Patent: *Oct. 5, 1999

[54] POLYMERS MADE WITH METAL OXIDE SOLS

[75] Inventors: Hong-Son Ryang, Camirillo; Young Jin Chung, Calabasas, both of Calif.; Joseph T. Snyder, II, Chesterland, Ohio; An-Min Jason Sung, Morris Plains, N.Y.

[73] Assignee: Reliance Electric Industrial Co., Cleveland, Ohio

[ * ] Notice: This patent is subject to a terminal disclaimer.

[21] Appl. No.: 09/023,175

[22] Filed: Feb. 13, 1998

Related U.S. Application Data

[63] Continuation of application No. 08/801,832, Feb. 14, 1997, Pat. No. 5,780,525.

[51] Int. Cl.⁶ .................................. C08F 4/06; C08F 4/42
[52] U.S. Cl. ............................. 526/89; 526/95; 526/107; 526/183; 526/185; 526/192; 526/237; 526/317.1; 522/81
[58] Field of Search ............................ 522/81, 83, 84, 522/85, 104, 107, 182, 92, 96; 427/508, 512, 517, 519; 526/89, 95, 107, 183, 185, 192, 237, 317.1

[56] References Cited

U.S. PATENT DOCUMENTS

| | | | |
|---|---|---|---|
| 4,493,873 | 1/1985 | Keane et al. | 428/372 |
| 4,546,041 | 10/1985 | Keane et al. | 428/372 |
| 4,605,570 | 8/1986 | Felter et al. | 427/386 |
| 4,760,296 | 7/1988 | Johnston et al. | 428/372 |
| 4,806,806 | 2/1989 | Hjortsberg et al. | 310/45 |
| 4,923,518 | 5/1990 | Brand et al. | 106/429 |
| 4,935,302 | 6/1990 | Hjortsberg et al. | 428/383 |
| 5,047,174 | 9/1991 | Sherif | 252/309 |
| 5,061,554 | 10/1991 | Hjortsberg et al. | 428/220 |
| 5,194,184 | 3/1993 | Takeyama et al. | 252/609 |
| 5,284,900 | 2/1994 | Izubayashi et al. | 524/492 |
| 5,336,851 | 8/1994 | Sawada et al. | 174/110 |
| 5,389,361 | 2/1995 | Osterried et al. | 424/59 |
| 5,474,799 | 12/1995 | Thigpen et al. | 427/104 |
| 5,506,311 | 4/1996 | Tamai et al. | 525/436 |
| 5,519,088 | 5/1996 | Itoh et al. | 524/812 |
| 5,561,186 | 10/1996 | Nagaoka et al. | 524/538 |
| 5,654,095 | 8/1997 | Yin et al. | 428/372 |
| 5,780,525 | 7/1998 | Ryang et al. | 522/81 |

OTHER PUBLICATIONS

C.J. Brinker and G.W. Sherer, Chapter 1: Introduction, Sol–Gel Science, Physics and Chemistry of Sol–Gel Processing (1990), pp. 1–13.

C.J. Brinker and G.W Sherer, Chapter 2: Hydrolysis and Condensation I, Nonsilicates, Sol–Gel Science, Physics and Chemistry of Sol–Gel Processing (1990), pp. 20–79.

*Primary Examiner*—Marion McCamish
*Assistant Examiner*—Cheryl Juska
*Attorney, Agent, or Firm*—Gregory Trurocy; John M. Miller; John J. Horn

[57] ABSTRACT

In one embodiment, the present invention relates to a polymer prepared from a mixture containing a polymerization material and a polycondensation product of a partially hydrolyzed chelated metal oxide precursor. In another embodiment, the present invention relates to a process for making a polymer involving contacting a polymerization material with a metal oxide sol comprising a liquid and a polycondensation product of a partially hydrolyzed chelated metal oxide precursor to form a mixture and at least one of polymerizing and curing the mixture of the polymerization material and the polycondensation product.

22 Claims, No Drawings

POLYMERS MADE WITH METAL OXIDE SOLS

This application is a continuation of Ser. No. 08/801,832, filed Feb. 14, 1997, now U.S. Pat. No. 5,780,525.

FIELD OF THE INVENTION

The invention relates to polymers made with metal oxide sols. More specifically, the invention relates to polymers made with metal oxide sols, prepolymer mixtures containing a metal oxide sol and processes for making a polymer with a metal oxide sol.

BACKGROUND OF THE INVENTION

It is known to incorporate filler type additives into polymers as a means of enhancing the properties of the polymer or as a means of imparting new properties to the polymer. For instance, it is known to add silica filler to resins in an attempt to improve the physical properties of the resin.

As a specific example, curable electrical component coatings include inorganic additives to achieve the desired surface electrical stress endurance. Such inorganic additive materials include alumina, silica and fumed metal oxide particulate additives and other non-transparent materials. Many inorganic additives are by nature resistive to high temperature processing, both in production and in use, and they are resistive to oxidative degradation. Most inorganic additives, however, due to their compositional and physical makeup, require the use of high shear mixing when incorporated into a polymer to achieve a uniform, homogeneous composition. High shear mixing inherently creates voids in the resulting polymer coating due to the entrapment of air in the protective polymer coating mixture. The presence of voids in the cured polymer coating allows corona generation which attacks the underlying substrate and degrades the polymer coating itself under electrical stress when in use. Accordingly, it is desired to provide an additive which does not require high shear mixing and/or which does not lead to the presence of voids in a polymer which it is incorporated.

In photocurable resin systems, using non-transparent material additives with photocure processing techniques results in non-uniform curing, as the light energy curing agent may unevenly penetrate the curable resin, due to particle blockage and scattering, thus curing some resin segments and not curing others. Another problem caused by the same uneven, non-uniform penetration of the various additives is the premature cure of the resin. When using a photo initiated curing process, it is generally necessary to have particles of less than 0.2 microns. Particles in excess of 0.2 microns are capable of scattering light, thus potentially resulting in uneven curing. Commercially available particulate fillers which require high speed mixing to maintain homogeneity tend to agglomerate causing regions of higher particle concentration and regions of lower concentration. This can lead to accelerated oxidation in the particle-poor regions. Accordingly, it is desired to provide an additive which does not agglomerate, which is small in size, transparent in nature and/or capable of uniform distribution.

One problem with using metal oxide particulate material in a liquid substance is the propensity for precipitation of the material from a solution over time, thus limiting the shelf life of the solution. For example, the use of commercially available fumed alumina or silica results in precipitation of the particulate metal oxide material after about one week in storage. Since fumed alumina or silica is of high viscosity, increased amounts of solvent are needed to attain a coatable composition. Accordingly, it is desired to provide an additive which does not precipitate from solution and/or has a desirable viscosity.

U.S. Pat. No. 4,760,296 generally relates to the inclusion of organosilicates or organoaluminates as the organometallic material of choice to achieve improved electrical stress endurance of an epoxy resin system. The '296 patent also relates to organoaluminates such as aluminum acetylacetonate and aluminum di-sec-butoxide acetoacetic ester chelate, which can be used to produce clear resins. However, the organoaluminum compounds of the '296 patent are not suitable for a variety of resin systems. This is because they tend to (1) plasticize the cured articles, (2) generate non-uniform distribution of the additives in the cured articles, and/or (3) bleach out with aging. The same three disadvantages are associated with using fumed aluminum oxide in resin systems. Using fumed aluminum oxide also involves the disadvantages that a clear solution cannot be formed and that the viscosity is undesirably high, further contributing to the creation of voids in the resulting coating thus rendering the coating susceptible to corona attack.

Plasmas are useful for etching metals, semiconductors and dielectrics during the processing of microelectronic materials such as wafers. Plasmas are also useful for cleaning, de-scumming, stripping and passivating various surfaces of microelectronic materials. Plasma is an unstable mixture of positive ions, negative ions and free radicals. Examples of plasma include energized silicon tetrafluoride, Freons and oxygen. Accordingly, a plasma environment is a very severe and potentially damaging environment, especially to polymeric materials. In the specific case of oxygen, monoatomic oxygen attack (oxygen plasma) can be very damaging to polymeric materials. This can be a problem if it is desired not to damage a polymeric substance in a plasma environment. It is therefore desirable to provide a polymeric substance which is plasma resistant.

These problems are minimized and/or eliminated by using the polymers made with metal oxide sols of the present invention.

SUMMARY OF THE INVENTION

In one embodiment, the present invention relates to a polymer prepared from a mixture containing a polymerization material and a polycondensation product of a partially hydrolyzed chelated metal oxide precursor.

In another embodiment, the present invention relates to a process for making a polymer involving contacting a polymerization material with a metal oxide sol comprising a liquid and a polycondensation product of a partially hydrolyzed chelated metal oxide precursor to form a mixture and at least one of polymerizing, curing, heating and cooling the mixture of the polymerization material and the polycondensation product.

In yet another embodiment, the present invention relates to a prepolymer mixture containing a polymerization material; and a metal oxide sol comprising a liquid and a polycondensation product of a partially hydrolyzed chelated metal oxide precursor.

The metal oxide sols are not particulate fillers which are added to polymers and physically trapped by the polymer network whereby the fillers are readily detectable in the resultant polymer system. Instead, the polycondensed partially hydrolyzed chelated metal oxide precursors are chemically incorporated into the polymer network on a molecular level. It is believed that open functionalites (reactable functional group of the multifunctional compound) of the metal oxide sol react with the polymer during polymerization, curing, heating, and/or cooling thereby uniformly dispersing itself on a molecular level throughout the resultant polymer.

DETAILED DESCRIPTION OF THE INVENTION

The invention relates to a polymer made with a metal oxide sol. The inventive polymer may be made with a polymerization material and a metal oxide sol. The inventive polymer may include one or more additives such as a cross-linking agent and an initiator. In one embodiment, the polymerization material is a curable resin, and in particular, a light or UV curable resin, such as acrylics, methacrylates and unsaturated polyesters. In another embodiment, the polymerization material is at least one thermosetting resin which can be cured by means of external energy such as heat, light or electron beam to form at least a partially three dimensional cured product. In another embodiment, the polymerization material is at least one thermoplastic resin. In yet another embodiment, the polymerization material is a mixture containing at least one thermoplastic resin and at least one thermosetting resin. Although a number of categories of the polymerization materials are described below, it will be understood that in some instances there is overlap between any two or more given categories of polymerization materials.

The term "hydrocarbyl" as used herein includes hydrocarbon as well as substantially hydrocarbon groups. Substantially hydrocarbon describes groups which contain heteroatom substituents which do not alter the predominantly hydrocarbon nature of the group. Examples of hydrocarbyl groups include hydrocarbon substituents, i.e., aliphatic (e.g., alkyl or alkenyl) and substituted aliphatic substituents, alicyclic (e.g., cycloalkyl, cycloalkenyl) substituents, aromatic-, aliphatic- and alicyclic-substituted aromatic substituents. Heteroatoms include, by way of example, nitrogen, oxygen and sulfur.

The polymerization material is any material capable of forming a pre-polymer material, a partially polymerized material or a polymer. The polymerization material may be monomers, a B-staged polymer, or a polymer. In one embodiment, the polymerization material is at least one of an acrylic resin, an unsaturated polyester resin, a saturated polyester resin, an alkyd resin, a vinyl ester resin, a polyurethane resin, an epoxy resin, a phenol resin, an urea-aldehyde resin, a polyvinyl aromatic, a maleimide resin, a polyvinyl halide resin, a polyolefin, a polyorganosiloxane, an amino resin, a polyamide, a polyimide, a polyetherimide, a polyphenylene sulfide resin, an aromatic polysulfone, a polyamideimide, a polyesterimide, a polyesteramideimide, a polyvinyl acetal, a fluorinated polymer, a polycarbonate and the like.

Suitable polymerization materials include acrylic resins. Examples of acrylic monomers include monoacrylics, diacrylics, triacrylics, tetraacrylics, pentacrylics, etc. Acrylic resins may be represented by Formula (I):

$$[(R^1)_2C=C(R^1)COO]_nR^2 \quad (I)$$

where each $R^1$ is independently selected from hydrogen and a monovalent hydrocarbyl group of 1 to about 13 carbon atoms, $R^2$ is hydrogen or a mono- or polyvalent organic group of 1 to about 13 carbon atoms, and n is an integer having a value of 1 to about 4.

Examples of monoacrylates include isobornylacrylate, isobornylmethacrylate, ethoxyethoxyethyl acrylate, 2-carboxyethylacrylate, ethylhexylacrylate, 2-hydroxyethylacrylate, 2-phenoxyethylacrylate, 2-phenoxyethylmethacrylate, 2-ethylbutylmethacrylate, 9-anthracenylmethyl methacrylate, 4-chlorophenylacrylate, cyclohexylacrylate, dicyclopentenyloxyethyl acrylate, 2-(N, N-diethylamino)ethyl methacrylate, dimethylaminoeopentyl acrylate, caprolactone 2-(methacryloxy)ethylester, and furfurylmethacrylate, poly(ethylene glycol)methacrylate, acrylic acid and poly(propylene glycol)methacrylate.

Examples of suitable diacrylates include 2,2-bis(4-methacryloxyphenyl)propane, 1,2-butanediol diacrylate, 1,4-butanediol diacrylate, 1,4-butanediol dimethacrylate, 1,4-cyclohexanediol dimethacrylate, 1,10-decanediol dimethacrylate, diethylene glycol diacrylate, dipropylene glycol diacrylate, dimethylpropanediol dimethacrylate, triethylene glycol dimethacrylate, tetraethylene glycol dimethacrylate, 1,6-hexanediol diacrylate, neopentyl glycol diacrylate, polyethylene glycol dimethacrylate, tripropylene glycol diacrylate, 2,2-bis[4-(2-acryloxyethoxy)phenyl] propane, 2,2-bis[4-(2-hydroxy-3-methacryloxypropoxy) phenyl]propane, bis(2-methacryloxyethyl)N, N'-1,9-nonylene biscarbamate, 1,4-cycloheanedimethanol dimethacrylate, and diacrylic urethane oligomers (reaction products of isocyanate terminate polyol and 2-hydroethylacrylate).

Examples of triacrylates include tris(2-hydroxyethyl) isocyanurate trimethacrylate, tris(2-hydroxyethyl) isocyanurate triacrylate, trimethylolpropane trimethacrylate, trimethylolpropane triacrylate and pentaerythritol triacrylate. Examples of tetracrylates include pentaerythritol tetraacrylate, di-trimethylopropane tetraacrylate, and ethoxylated pentaerythritol tetraacrylate. Examples of pentaacrylates include dipentaerythritol pentaacrylate and pentaacrylate ester.

Acrylic polymerization materials also include another curable aliphatically unsaturated organic compound, such as an acrylamide represented by Formula (II):

$$[(R^1)_2C=C(R^1)CON(R^1)_2]_nR^2 \quad (II)$$

wherein $R^1$ and $R^2$ are as previously defined in Formula (I), and n is an integer having a value of 1 to about 4; and unsaturated polyesters, which are condensation products of unsaturated dicarboxylic acids and diols, and vinyl compounds, or compounds having a terminal double bond. In one embodiment, these materials are co-cured with the acrylic component by free radical technique. Examples of vinyl compounds include N-vinylpyrrollidone, styrene, vinyl naphthalene and vinylphtalimide. Polyacrylamides (including poly(meth)acrylamide derivatives) are commercially available. Some of the particular (meth)acrylamide derivatives useful in the present invention include N-alkyl- or N-alkylene-substituted or unsubstituted (meth) acrylamides. Specific examples thereof are acrylamide, methacrylamide, N-methacrylamide, N-methylmethacrylamide, N-ethylacrylamide, N,N-dimethylacrylamide, N,N-dimethylmethacrylamide, N,N-diethylacrylamide, N-ethylmethacrylamide, N-methyl-N-ethylacrylamide, N-isopropylacrylamide, N-n-propylacrylamide, N-isopropylmethacrylamide, N-n-propylmethacrylamide, N-acryloyloylpyrrolidine, N-methacryloylpyrrolidine, N-acryloylpiperidine, N-methacryloylpiperidine, N-acryloylhexahydroazepine, N-acryloylmorpholine and N-mathacryloylmorpholine.

The acrylic polymerization materials, as well as other resin systems described below, may also contain a photosensitizing amount of a photoinitiator or a combination of photoinitiators, i.e., an amount effective to effect the photocure of the composition in a non-oxidizing atmosphere, for example nitrogen, by absorbing the light energy, whether UV or visible, and generating radicals. Generally, the photoinitiator(s) is included in the acrylic resin in an amount of from about 0.01% to about 8.0% by weight, and preferably from about 0.1% to about 5.0% by weight of the curable resin. For example, some suitable unimolecular photoinitiators, which absorb light and decompose to generate radicals, include 2,2-dimethoxy-2-phenylacetophenone, 2-methoxy-2-phenylacetophenone, 2-dimethylamino-2-benzyl-1 (4-morpholiniphenyl)-buten-1-one and diphenyl-2,4,6-trimethlbenzoylphosphine oxide.

Bimolecular photoinitiators, where photoabsorbing compounds such as ketones react with electron donating compounds such as amines to generate radicals, include combinations of ketones and amines. Examples of such ketones are benzophenone, acetophenone, 2-isopropylthiothanthone, xanthone, benzyl, camphorquinone and coumarin derivatives. Examples of the amines include 2-(dimethylamino) ethanol and methyl p-(dimethylamino)benzoate.

In one embodiment, a cross-linking agent is used as part of the polymerization material to achieve specific properties in the resulting inventive polymer, i.e., softness, high temperature performance, etc. Suitable cross-linking agents according to this standard include di-functional and tri-functional acrylics, such as bisphenol-A dimethacrylate, tetra-functional acrylics, and di-pentaacrylates, such as dipentaerythretol pentaacrylate.

Other suitable polymerization materials include unsaturated and saturated polyester resins including alkyd resins. The unsaturated polyesters may be condensation polymers derived by the condensation of unsaturated polybasic acids and anhydrides, such as dibasic acids or anhydrides, with polyols, such as dihydroxy or trihydroxy compounds. The polyesters may include in the polymeric chain, varying proportions of other saturated or aromatic dibasic acids and anhydrides which are not subject to cross-linking. The particular non-cross-linking components and their properties will depend upon the desired properties of the final products.

Examples of unsaturated polybasic acids or anhydrides which may be utilized in the formation of the polyester resins include maleic acid, fumaric acid, itaconic acid, tetrahydrophthalic acid, or the anhydrides of any of the foregoing. Examples of saturated aliphatic polycarboxylic acids include adipic and succinic acids, and examples of aromatic dicarboxylic acids include phthalic acid, isophthalic acid, terephthalic acid and halogenated derivatives such as tetrachlorophthalic acid and anhydride.

Examples of polyols include dihydroxy and trihydroxy compounds which in turn include ethylene glycol, propylene glycol, 1,3-propanediol, 1,2-butanediol, 1,3-butanediol, 1,4-butanediol, diethylene glycol, dipropylene glycol, glycerol, neopentyl glycol, and reaction products of alkylene oxides with, for example, 2,2'-bis(4-hydroxyphenylene)propane (a bisphenol A).

The unsaturated polyesters are prepared by reacting the one or more unsaturated polybasic acids or anhydrides with the polyols (di- or tri-hydroxy compounds) in approximately equal proportions. Examples of such polyesters include polyesters prepared from: maleic anhydride and propylene glycol (1:1 molar ratio); isophthalic acid, maleic anhydride and propylene glycol (1:2:3 and 1:1:2 molar ratios); and adipic acid, maleic anhydride and propylene glycol (1:2:3 molar ratio). A wide variety of polyester resins that can be used are commercially available.

Suitable polymerization materials include vinyl ester resins. The vinyl ester resins that can be used are the reaction products of epoxy resins and a monofunctional ethylenically unsaturated carboxylic acids. They may be represented by Formula (III):

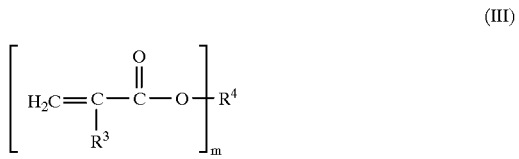

where $R^3$ is H or $CH_3$, $R^4$ is an epoxy resin, and m is about 2 to about 3, examples of the latter including epoxylated bisphenol A-epichlorohydrin and epoxylated phenol-formaldehyde novolac. These resins can be made by reacting an epoxy resin with an ethylenically unsaturated carboxylic acid. The epoxy resins that can be used include diglycidyl ether of bisphenol A and higher homologous thereof, the diglycidyl ether of tetrabromobisphenol A, epoxylated phenol-formaldehyde novolac, and polypropylene oxide diepoxide. The acids that can be used include acrylic and methacrylic acid. The acid-epoxide reaction can be catalyzed by tertiary amines, phosphines, alkali metal salts, or onium salts.

In one embodiment, the unsaturated polyester or vinyl ester is provided in a monomeric unsaturated polymerizable material. The monomeric unsaturated polymerizable material is characterized by a terminal ethylene group. In one embodiment, the terminal ethylene group is attached to an electronegative group such as the phenyl group as in styrene, halogen as in vinyl chloride, an acetoxy group as in vinyl acetate or a carbethoxy group as in ethyl acrylate. Examples of the monomeric unsaturated polymerizable materials include styrene, alpha-methyl styrene, chloro styrene, vinyl toluene, divinyl benzene, diallylphthalate, methyl methacrylate, and mixtures of two or more thereof.

An example of an unsaturated polyester and monomeric unsaturated polymerizable material solution that can be used is available from Reichhold Chemicals under Product Code 7568-44-3; this material is identified by the manufacturer as having an unsaturated polyester resin content of about 60% by weight and a styrene monomer content of about 35% by weight. Other examples include an unsaturated polyester resin based on propylene glycol and maleic anhydride and styrene monomer (31–36% monomer) mixture from Reichhold Chemicals under Product Code 31615-20; and a mixture of styrene monomer (26–32% by weight) and polyester resin from Owens-Corning Fiberglas as product E-903.

Suitable polymerization materials include polyurethanes. Polyurethanes can be prepared by reacting polyfunctional hydroxy compounds, such as glycols, polyols and hydroxy-terminated polyesters and polyethers, with polyfunctional aliphatic or aromatic isocyanates. Aliphatic or aromatic polyurethanes can be utilized.

Polyurethanes include isocyanate-terminated polyurethanes. The isocyanate-terminated polyurethane polymers are also referred to in the art as "prepolymers," and these polymers may be formed by the reaction of selected polyols having an average molecular weight of from about 200 to about 2000 with a stoichiometric excess of an organic polyisocyanate. Such prepolymers are capable of chain extension and crosslinking (commonly called curing) with water or other chain-extending agents.

Any organic compound containing at least two active hydrogen atoms may be reacted with the stoichiometric excess of organic polyisocyanate to form an isocyanate-terminated prepolymer which is then capable of molecular weight increase by curing as described above. The prepolymers may have a free isocyanate content of from about 5% to about 20% by weight based on the prepolymer content.

Any of a wide variety of polyisocyanates can be employed in the formation of the polyurethane prepolymers useful in the invention. Diisocyanates are preferred, but minor amounts of other polyisocyanates can be included. The isocyanates may be aliphatic, aromatic or mixed aliphatic-aromatic isocyanates. The diisocyanates generally have from about 6 to about 40 carbon atoms, and more often from about 8 to about 20 carbon atoms in the hydrocarbon group.

The polyisocyanate can be saturated, unsaturated, monomeric or polymeric. Illustrative examples of polyisocyanates which can be used include: 2,4-toluene diisocyanate; 2,6-toluene diisocyanate; m-phenylene diisocyanate; p-phenylene diisocyanate; 1,5-naphthalene diisocyanate; 4,4'-diphenyl ether diisocyanate; 4,4',4"-triphenylmethane triisocyanate; 2,4,4'-triisocyanatodiphenylmethane; 2,2',4-triisocyanato diphenyl; 4,4'-diphenylmethane diisocyanate; 4,4'-benzophenone diisocyanate; 2,2-bis(4-isocyanatophenyl)propane; 1,4-naphthalene diisocyanate; 4-methoxy-1,3-phenylene diisocyanate; 4-chloro-1,3-phenylenediisocyanate; 4-bromo-1,3-phenylene diisocyanate; 4-ethoxy-1,3-phenylene diisocyanate; 2,4'-diisocyanatodiphenyl ether; 4,4'-diisocyanatodiphenyl; 9,10-anthracene diisocyanate; 4,6-dimethyl-1,3-phenylene diisocyanate; 4,4'-diisocyanatodibenzyl; 3,3'-dimethyl-4,4'-diisocyanatodiphenylmethane; 3,3'-dimethyl-4,4'-diisocyanatodiphenyl; 3,3'-dimethoxy-4,4'-diisocyanatodiphenyl; 1,8-naphthalene diisocyanate; 2,4,6-toluene triisocyanate; 2,4,4'-triisocyanatodiphenyl ether; diphenylmethane diisocyanate available under the trademarks Mondur and Papi, having a functionality of 2.1 to 2.7; 1,3-xylene 4,6-diisocyanate; aromatic isocyanate-terminated polyurethanes; aromatic isocyanate-terminated prepolymers of polyesters; 1,6-hexamethylene diisocyanate; ethylene diisocyanate; propylene 1,2-diisocyanate; butylene 1,2-diisocyanate; butylene 2,3-diisocyanate; pentamethylene diisocyanate; cyclopentylene 1,3-diisocyanate; cyclohexylene 1,2-diisocyanate; cyclohexylene 1,3-diisocyanate; cyclohexylene 1,4-diisocyanate; 1-isocyanato-3-isocyanatomethyl-3,3,5-trimethyl cyclohexane; methylcyclohexyl diisocyanate; 2,4,4-trimethylhexamethylene diisocyanate; 1,10-decamethylene diisocyanate; diisocyanato dicyclohexyl methane; 1,5-diisocyanato-2,2-dimethyl pentane; hydrogenated 4,4'-diphenylmethane diisocyanate; hydrogenated toluene diisocyanate; $(OCNCH_2CH_2)_2S$; $(OCNCH_2CH_2CH_2)_2O$; $OCNCH_2CH_2CH_2CH(OCH_3) CH_2CH_2NCO$; and $OCNCH_2CH_2CH_2O(CH_2)_4 OCH_2CH_2CH_2NCO$.

Examples of commercially available polyisocyanates that can be used include Lupranate MP102 (a product of BASF identified as solvent-free urethane-modified diphenylmethane diisocyanate), and Rubinate 1780 (a product of ICI identified as polymeric methylene diphenyl diisocyanate).

The polyols may be aliphatic, cycloaliphatic, aromatic or mixed structures. These polyols are diols, including ether diols, triols including ether triols or mixtures thereof. Other polyols having greater than three hydroxy groups may also be used in conjunction with the diols and/or triols. The structure of the polyol is usually hydrocarbon in nature, but other substituents may be incorporated in the hydrocarbon moiety to effect changes in the properties of the resulting prepolymer. The molecular weights of these polyols average up to about 2000 or more but those of 300 to about 1000 average molecular weight are preferred. Examples of polyols useful in the present invention include those listed in connection with the polyesters, and preferable polyols include polyoxyethylene glycols, polyoxypropylene glycols, polyoxybutylene glycols, etc. Useful monomeric glycols include ethylene glycol, propylene glycol, butene diols, 1,6-hexamethylene glycol, etc. Examples of triols include trimethylol propane, trimethylol ethane, glycerol, 1,2,6-hexane triol, etc.

Hydroxy-terminated polyester materials also are useful hydroxy reactants. Such hydroxy-terminated polyester materials can be prepared by the reaction of one or more of the polyhydroxy materials described above with one or more aliphatic, including cycloaliphatic, or aromatic polycarboxylic acids or esters, and such polyesters can often have hydroxyl values in the range of from about 25 to about 150. Examples of such acids include phthalic acid, adipic acid, sebacic acid, etc.

In one embodiment, organo tin compounds, are useful catalysts for the hydroxyl/isocyanate reaction. Examples of such organo tin compounds include dibutyl tin dilaurate, stannous octoate, dibutyl tin (IV) diacetate and dibutyl tin (IV) oxide. An example of a commercially available organo tin compound that can be used is Fastcat 4202, which is a product of M&T Chemicals identified as dibutyl tin dilaurate. Other useful catalysts include tertiary aliphatic and alicyclic amines such as triethylamine, triethanolamine, tri-n-butylamine, etc. Mixtures of catalysts can also be employed.

The polymerization initiator may be a free radical initiator capable of generating free radicals that can initiate cross-linking or curing. In one embodiment, the polymerization initiators are chosen from materials which contain either a peroxide group or an azo group. Examples of useful peroxide compounds include t-butyl perbenzoate, t-butyl peroctoate, benzoyl peroxide, t-butyl hydroperoxide, succinic acid peroxide, cumene hydroperoxide and dibenzoyl peroxide. Examples of useful azo compounds include azobisisobutyronitrile and t-butylazoisobutyronitrile. Generally, the concentration of an initiator in the inventive composition is from about 0.1% to about 5% by weight, and in one embodiment about 0.2% to about 1% by weight, based on the total weight of the inventive composition.

The isocyanate-terminated polyurethanes can be prepared by the simultaneous reaction of an excess organic polyisocyanate and polyol, or by reacting part or all of a polyol prior to reaction of the remaining amount of the material with the isocyanate. Generally, it is preferred to add the polyisocyanate to an essentially inert organic solvent solution of polyol from which all moisture has been removed. The reaction between the polyol and the organic polyisocyanate generally is completed in about 1 to 3 hours in the absence of a catalyst. When a catalyst is used, a reaction period of about 10 minutes to about 3 hours is sufficient. General examples of polyurethanes include those under the trade designation Estane from BFGoodrich, Pellethane from Dow Plastics, Texin and Desmopan from Bayer and Carbon-Flex from Cabot.

Suitable polymerizable materials include epoxy resins. Epoxy resins include resins comprised of monomers, oligomers, and polymers containing one or more oxirane rings. The oxirane ring reacts by ring opening, which is not considered a condensation reaction, but rather an opening of the oxirane ring by initiated by acidic or basic catalysts. Epoxy resins may vary greatly in the nature of their backbones and substituent groups. A wide variety of such resins are available commercially. Such resins have either a mixed aliphatic-aromatic or an exclusively non-benzeneoid (i.e., aliphatic or cycloaliphatic) molecular structure. Representative examples of acceptable substituent groups include halogens, ester groups, ether groups, sulfonate groups, siloxane groups, nitro groups, and phosphate groups. Mixtures of various epoxy-containing materials may be used in the compositions of the invention.

The mixed aliphatic-aromatic epoxy resins which are useful with the present invention are prepared by the well-known reaction of a bis(hydroxy-aromatic) alkane or a tetrakis-(hydroxyaromatic)-alkane with a halogen-substituted aliphatic epoxide in the presence of a base such as, e.g., sodium hydroxide or potassium hydroxide. Under these conditions, hydrogen halide is first eliminated and the aliphatic epoxide group is coupled to the aromatic nucleus via an ether linkage. Then the epoxide groups condense with the hydroxyl groups to form polymeric molecules which vary in size according to the relative proportions of reactants and the reaction time.

In lieu of the epichlorohydrin, one can use halogen-substituted aliphatic epoxides containing about 4 or more carbon atoms, generally about 4 to about 20 carbon atoms. In general, it is preferred to use a chlorine-substituted terminal alkylene oxide (terminal denoting that the epoxide group is on the end of the alkyl chain) and a particular preference is expressed for epichlorohydrin by reason of its commercial availability and excellence in forming epoxy resins useful for the purpose of this invention. If desired, the halogen-substituted aliphatic epoxide may also contain substituents such as, e.g., hydroxy keto, nitro, nitroso, ether, sulfide, carboalkoxy, etc.

Similarly, in lieu of the 2,2-bis-(p-hydroxyphenyl)-propane, one can use bis-(hydroxyaromatic) alkanes containing about 16 or more carbon atoms, generally about 16 to about 30 carbon atoms such as, e.g., 2,2-bis-(1-hydroxy-4-naphthyl)propane; 2,2-bis(o-hydroxyphenyl)propane; 2,2-bis-(p-hydroxyphenyl) butane, 3,3-bis-(p-hydroxyphenyl) hexane; 2-(p-hydroxyphenyl)-4-(1-hydroxy-4-naphthyl) octane, 5-5-bis-(p-hydroxy-o-methylphenyl)-decane, bis-(p-hydroxyphenyl) methane, 2,2-bis-(p-hydroxy-o-isopropylphenyl)propane, 2,2-bis-(o,p-dihydroxyphenyl) propane, 2-(p-hydroxyphenyl)-5-(o-hydroxyphenyl) hexadecane, and the like. If desired, the bis-(hydroxyaromatic)alkane may contain substituents such as, e.g., halogen, nitro, nitroso, ether, sulfide, carboalkoxy, etc. In general, it is preferred to use a bis-(p-hydroxyphenyl) alkane since compounds of this type are readily available from the well-known condensation of phenols with aliphatic ketones or aldehydes in the presence of a dehydrating agent such as sulfuric acid. Particularly preferred is 2,2-bis-(p-hydroxyphenyl)propane, which is available commercially as "Bisphenol A".

Epoxy resins are available from a wide variety of commercial sources. One group is known by the general trade designation "Epon" resins and are available from Shell Chemical Co. For example, "Epon 820" is an epoxy resin having an average molecular weight of about 380 and is prepared from 2,2-bis-(p-hydroxyphenyl)propane and epichlorohydrin. Similarly, "Epon 1031" is an epoxy resin having an average molecular weight of about 616 and is prepared from epichlorohydrin and symmetrical tetrakis-(p-hydroxyphenyl)ethane. "Epon 828" has a molecular weight of 350–400 and an epoxide equivalent of about 175–210. Epoxy resins such as Araldite 6010, manufactured by Ciba-Geigy can also be utilized. These epoxy resins are of the glycidyl-type epoxide, and are preferably diglycidyl ethers of bis-phenol A which are derived from diglycidyl and epichlorohydrin.

Another group of commercially available epoxy resins are identified under the general trade designation EPI-REZ (Celanese Resins, a Division of Celanese Coatings Company). For example, EPI-REZ 510 and EPI-REZ 509 are commercial grades of the diglycidyl ether of Bisphenol A differing slightly in viscosity and epoxide equivalent.

Another group of epoxy resins are available from Furane Plastics Inc., Los Angeles, Calif. under the general trade designations EPIBOND and EPOCAST. For example, EPI-BOND 100A is a one component epoxy resin powder available from Furane which is curable to a hard resin in the absence of any hardener.

Liquid forms of epoxy resin are also useful. These liquid forms normally comprise very viscous liquids requiring some degree of heating to permit withdrawal from storage containers. Certain "D.E.R." and "D.E.W." resins obtainable from Dow Chemical Company and "Epotuf" liquid epoxy resins obtainable from Reichhold Chemicals Inc. are examples of such resins preferred for employment in accordance with the invention. An example of an "Epotuf" liquid epoxy resin in the undiluted medium high viscosity #37–140 having an epoxide equivalent weight of 180–195, a viscosity (ASTM D445) of 11,000–14,000 cps at 525° C., and a Gardner Color Maximum of 3. This is a standard general purpose epoxy resin.

In some embodiments of the invention the epoxy resins may be "solubilized" by neutralization with a basic compound such as an organic amine. Examples of amines include amines and hydroxyamines including diethylamine, triethylamine, triethanolamine, dimethylethanolamine, etc. Epoxy resins also include polyamide modified epoxy resins, such as AF-42 from Minnesota Mining and Manufacturing Co.

Additional examples of the epoxy resins derived from amines include tetraglycidyidiaminodiphenylmethane, triglycidyl-p-aminophenol, triglycidyl-m-aminophenol and triglycidylaminocresol and their isomers, examples of the epoxy resins derived from phenols include bisphenol A epoxy resins, bisphenol F epoxy resins, bisphenol S epoxy resins, phenol-novolak epoxy resins, cresol-novolak epoxy resins and resorcinol epoxy resins, and examples of the epoxy resins whose precursors are compounds having a carbon-carbon double bond are alicyclic epoxy resins. Moreover, brominated epoxy resins prepared by brominating these epoxy resins can be used, but the present invention is not restricted to the use of these compounds. Furthermore, mixtures of two or more of the epoxy resins can be used and monoepoxy compounds can also be incorporated.

Generally, epoxy resins for use in the invention are compositions comprising glycidyl ether monomers. Representative examples of these are the glycidyl ethers of polyhydric phenols obtained by reacting a polyhydric phenol with an excess of chlorohydric, such as epichlorohydrin. Specific examples of epoxy resins include 2,2-bis[4-(2,3-epoxypropoxy)phenyl]propane(diglycidyl ether of bisphenol A) and commercially available materials under the trade designation "Epon 828F", "Epon 1004F" and "Epon 1001F" available from Shell Chemical Co., "DER-331", DER-332" and "DER-334" available from the Dow Chemical Co. Preferred is the diglycidyl ether of bisphenol A. A composition meeting this description is available under the trade designation "CMD 35201" available from Rhone Poulenc, Inc., Louisville, Ky. Other suitable epoxy resins include glycidyl ethers of phenol formaldehyde novolak resins (e.g., "DEN-431" and "DEN-438" available from the Dow Chemical Co.), and resorcinol digylcidyl ether. Additional examples of epoxides are described in U.S. Pat. No. 3,018,262, incorporated herein by reference.

As noted, epoxy resins generally require curing agents which react with the oxirane groups of the epoxy resin to form cross-linked binders. Curing agents useful in the invention are typically and preferably selected from amides and imidazoles. One useful amide is the polyamide known under the trade designation "VERSAMID 125", commercially available form Air Products, Allentown, Pa., which is a 100 percents solids version of 2-ethyl-4-methyl imidazole.

Suitable polymerizable materials include phenol resins and urea-aldehyde resins. Phenolic resins and urea-aldehyde resins useful in the invention as thermosetting resins include those disclosed in U.S. Pat. No. 5,178,646, columns 15–17, which is incorporated herein by reference. These resins comprise the reaction product of an aldehyde and a non-aldehyde such as a urea compound or a phenolic compound. The general term "phenolic" includes phenol-formaldehyde resins as well as resins comprising other phenol-derived compounds and aldehydes. The phenolic resins are any of the several types of synthetic thermosetting resins made by reacting a phenol, cresol, zylenol, xylenol, p-t-butyl phenol, p-phenyl phenol, bisphenol and resorcinol with an aldehyde. Examples of the aldehydes include formaldehyde, acetaldehyde and furfural.

Resole phenolic resins can be catalyzed by alkaline catalysts, and the molar ratio of formaldehyde to phenol is greater than or equal to one, typically between 1.0 to 3.0, thus presenting pendant methylol groups. Alkaline catalysts suitable for catalyzing the reactions between aldehyde and phenolic components of resole phenolic resins include sodium hydroxide, barium hydroxide, potassium hydroxide, calcium hydroxide, organic amines, and sodium carbonate, all as solutions of the catalyst dissolved in water. A general discussion of phenolic resins and their manufacture is given in Kirk-Othmer, *Encyclopedia of Chemical Technology*, $3^{rd}$ Ed., John Wiley & Son, 1981, N.Y., Vol. 17, p. 349-et.seq., which is incorporated herein by reference.

Examples of commercially available phenolic resins useful in the invention include those known by the trade names "Vacrum" (from Durez Division of Occidental Chemical Corp.), "Aerofene" (from Ashland Chemical Co.), "Valite" from Lockport Thermosets and "Bakelite" from Union Carbide. A standard, 70% solids (1.96:1.0 molar ratio of formaldehyde to phenol) phenolic resin having a 2 weight percent KOH per weight of phenol is available from Nests Resins Canada, Mississauga, Ontario, Canada.

Suitable polymerizable materials include polyvinyl aromatics. Polyvinyl aromatics are commercially available. Examples of polyvinyl aromatics include polystyrene, copolymers and terpolymers of one or more of the following polystyrene, polystyreneacrylonitrile, polystyrenebutadieneacrylonitrile, vinyltoluene, α-methylstyrene, chloromethylstyrene. Specific aromatic resins include those known under the trade designations Dylite M-77A, M-77B, M-77C and 33mA-B-C from Arco, Styropor BF 122, 322 and 422 from BASF, 3486, 4486, 254, 454 and 554 from Huntsman, MA500, MB500, MB950 and MBC 590 from StyroChem, "Piccolastic A75", "Picco 6100", and "Picco 5140" all solids at room temperature and all commercially available from Hercules, Inc., Wilmington, Del. "Piccolastic A75" is a low molecular weight thermoplastic polystyrene resin, and "Picco 6100" and "Picco 5140" are low molecular weight, nonpolar, aromatic thermoplastic polymerized resins derived from $C_7$ to $C_9$ monomers.

Other aromatic resins include those known under the trade designations "Tacolyn 1085", "Piccotex LC-55WK" and "Piccotac 95-55WK" which are aqueous, 55 percent solids, organic solvent-free, resin dispersions commercially available from Hercules Inc., Wilmington, Del. "Piccotex LC-55WK" is an anionic dispersion of a polymerized resin known under the trade designation "Piccotex LC" (also from Hercules) derived from copolymerizing vinyl toluene and alpha-methyl styrene. "Piccotac 95-55WK" is a dispersion of a polymerized aliphatic hydrocarbon resin known under the trade designation "Piccotac 95", also from Hercules.

Suitable polymerizable materials include maleimide resins. Maleimide resins may be derived from those compounds which contain 2 or more maleimide groups, on average, in a molecule and may be represented by Formula (IV):

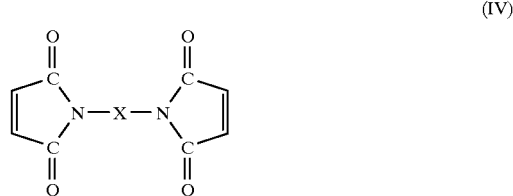

(IV)

(wherein X is an alkylene group, a cycloalkylene group, a divalent hydrocarbyl group such as monocyclic or polycyclic arylene group or a divalent hydrocarbyl group bound with a divalent atomic group such as —$CH_2$—, —CO—, —$SO_2$—, —O—, —$C(CH_3)_2$—, —CONH) or from maleimide compounds obtained by reacting maleic anhydride with a mixed polyamine. As maleimide compounds of this type, there are, for example, N,N'-phenylenebismaleimide, N,N'-hexamethylenebismaleimide, N,N'-oxy-di-p-phenylenebismaleimide, N,N'-4,4'-benzophenonebismaleimide, N,N'-diphenylsulfonebismaleimide, N,N'-(3,3'-dimethyl)-methylene-di-p-phenylenebismaleimide, N,N'-4,4'-dicyclohexylmethanebismaleimide, N,N'-m(or p)-xylenebismaleimide, N,N'-(3,3'-dimethyl)methylene-di-p-phenylenebismaleimide, N,N'-m-tolylenedimaleimide, bismaleimide of bis(aminophenoxy) benzene and a reaction product of maleic anhydride with a mixed polyamine which is a reaction product of aniline and formaline, but the present invention is not restricted to the use of these compounds. Moreover, these maleimide compounds can be used as a mixture of two or more compounds and monomaleimide compounds such as N-allymaleimide, N-propylmaleimide, N-hexylmaleimide and N-phenylmaleimide can be incorporated.

Maleimide resins are preferably used in combination with a curing agent. As the curing agent, and compounds which has an active group being reactive with the maleimide group can be used. Particularly suitable are those compounds which have an amino group, an alkenyl group exemplified by an allyl group, a benzocyclobutene group, an allyl-nadicimide group, an isocyanate group, a cyanate group or an epoxy group. For example, as a curing agent having an amino group, diamino-diphenylmethane is a representative compound and as a curing agent having an alkenyl group, o,o'-diallyl-bisphenol A and bis(propenylphenoxy) sulfone are cited.

Suitable polymerizable materials include polyvinylhalides. In particular, homo and copolymers of polyvinylchloride, polyvinylfluoride and polyvinylidene fluoride and difluoride may be used. The polyvinylchloride resins (sometimes referred to herein as PVC resins) which are suitable for use in the present invention are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides such as vinyl fluoride and vinyl bromide; alpha-olefins such as ethylene, propylene and butylene; vinyl esters such as vinyl acetate, vinyl propionate, vinyl butyrate and vinyl hexanoate, or partially hydrolyzed products thereof such as vinyl alcohol; vinyl ethers such as methyl vinyl ether, propyl vinyl ether and butyl vinyl ether; acrylic esters such as methyl acrylate, ethyl acrylate, methyl methacrylate and butyl methacrylate and other monomers such as acrylonitrile, vinylidene chloride and dibutyl maleate. Such resins are generally known any many are commercially available.

Examples of polyvinylchloride resins that are commercially available include a number of those under the trade designation GEON® including GEON® 92, a medium high molecular weight porous suspension PVC resin; GEON® 128, a high molecular weight dispersion grade polyvinylchloride resin; and GEON® 11X 426FG, a medium molecular weight PVC resin. The GEON® resins are available from the Geon Company. Preferred PVC resins are UV light stabilized compositions. Examples of polyvinylidene fluoride resins include those under the trade designations Hylar from Ausimont and Kynar from Elf Altochem.

The PVC resins may contain significant amounts of plasticizers, generally, from about 10% to about 60% by weight of at least one plasticizer. The plasticizers which are incorporated into the PVC resins may be any of the substances conventionally used to plasticize PVC resins. These are normally considered to fall into two classes: high molecular weight or polymeric plasticizers (of molecular weight of about 750 to 5000) and low molecular weight of monomeric plasticizers (of molecular weight of about 300 to 1000). The higher molecular weight plasticizers such as chain-stopped polypropylene glycol adipate or poly(1,3-butane diol azolate) have lower volatility. More specific examples of plasticizers include esters of dibasic organic acids or phosphoric acid, derivatives of castor oil, epoxidized vegetable oils, ethylene glycol derivatives, polyesters, chlorinated paraffin or chlorinated fatty acid esters.

Generally, the plasticizers utilized in the PVC resins are medium to high-molecular weight liquid di- and tri-esters of organic acids. Chlorinated polyethylene and ethylene-vinyl acetate resins are examples of the plasticizers which have been referred to as solid plasticizers. These are generally polymers which alloy with the host resin and impart some combination of increased flexibility and impact resistance.

Phthalate esters are the most commonly used class of plasticizers. These compounds are used not only for PVC resins, but also for polyvinyl acetate, polyolefins, polyurethanes, etc. However, the amount of plasticizer utilized in the polyolefins and polyurethanes is much less than the amount used in PVC resins. A listing of commercially available plasticizers is found in Modern Plastics Encyclopedia, 1993, pp. 326–335.

The PVC resins may contain other materials normally used to provide desirable properties to the PVC resins. For example, the PVC resins may also contain: heat and light stabilizers, such as alkyl aryl phosphates and 4,4'-butylidene-bis(6-t-butyl-m-cresol); lubricants; colorants such as dyes and pigments; foaming agents, wetting agents; flame-retardants; antistatic agents; thickening agents and coupling agents.

Suitable polymerizable materials include polyolefins. Polyolefins include polymer and copolymers of monoolefins having from 2 to about 20 carbon atoms and more preferably from 2 to about 12 carbon atoms per molecule. Monoolefins useful for making polyolefins preferably contain a terminal olefin bond and these include ethylene, propylene, 1-butene, 1-pentene, 4-methyl-1-pentene, 3-methyl-1-butene, 1-octene, 1-decene and 4-ethyl-1-hexene. Examples of such homopolymers include polyethylene (including low density, medium density, high density, linear low density and ultralow density polyethylene), polypropylene (including low density, high density and isotactic polypropylene), poly-1-butene, poly-3-methyl-1-butene and poly-4-methyl-1-pentene. The examples of copolymers within the above definition include copolymers of ethylene with from about 1% to about 99% by weight of propylene, copolymers of propylene with about 1% to about 99% by weight of ethylene or 1-butene, etc. Polymers prepared from blends of copolymers or blends of copolymers with homopolymers also are useful. These polymers are available from a number of sources including Phillips, Shell, Himont and Exxon.

Suitable polymerizable materials include silicone polymers, such as a polyorganosiloxane. In a specific embodiment, the polyorganosiloxane is a polydimethylsiloxane. The polysiloxanes may be thermally cured or radiation cured. Generally, the thermally curable compositions comprise at least one polyorganosiloxane and at least one catalyst or curing agent for such polyorganosiloxane(s). Such compositions may also contain at least one cure accelerator.

A wide variety of polyorganosiloxanes (commonly called silicones) can be used in the practice of the invention. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon-oxygen linkages, i.e., by Formula (V):

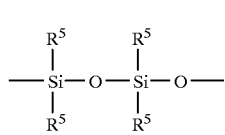

(V)

wherein each $R^5$ is independently an organic group, generally an alkyl group. Various polyorganosiloxanes are commercially available in organic solvents in various percent solids concentration. Exemplary of the silicone (polyorganosiloxane) materials which can be used in forming the silicone polymers of the invention are those disclosed in U.S. Pat. Nos. 2,258,218; 2,258,220; 2,258,222; 2,494,920; 3,432,333; and 3,518,325 which are hereby incorporated by reference.

Suitable catalysts which can be employed in the curing of the polyorganosiloxanes include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for polyorganosiloxanes. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. The amine salts of carboxylic acids can also be used as curing agents.

Curing of the polyorganosiloxanes can take place at room temperature depending upon the particular silicone material used and the particular curing agent or catalyst used in conjunction with the silicone material. Most curing agents or catalysts are capable of promoting relatively rapid curing at moderate elevated temperatures. For the preferred polyorganosiloxanes described herein, this temperature is in the range of about 160° F. to about 650° F. Once curing has been initiated and maintained at an elevated temperature for a short period of time as described herein, the curing can then advantageously be allowed to proceed by aging at reduced temperatures, e.g., at room temperatures or moderately (25° F. to 50° F.) above room temperature. The choice of temperature actually employed in the curing steps will depend upon a number of factors such as the type of silicone coating material used and the curing catalyst used with said silicone material.

Curable polyorganosiloxanes can be cured by ultraviolet or electron beam radiation with or without the assistance of a photoinitiator such as benzophenone. One type of polyorganosiloxane contains acryloxy groups, methacryloxy groups, or mixtures thereof. A variety of acryloxy or methacryloxy containing polyorganosiloxanes are known and can be used. In one embodiment, the polyorganosiloxane compounds containing acryloxy and/or methacryloxy groups which can be utilized may be presented- by Formula (VI):

$$[R_nSiO_{4-n/2}]_m \qquad (VI)$$

wherein each R is acryloxy, methacryloxy, an n-substituted monovalent hydrocarbyl group containing from 1 to about 20 carbon atoms or a substituted monovalent hydrocarbyl group wherein the substituents are selected from the class consisting of chloro-, fluoro-, cyano-, amido-, nitro-, ureido-, isocyanato-, carbalkoxy-, hydroxy-, acryloxy-, methacryloxy-, etc.; n has an average value of about 1.8 to 2.2; and m has an average value greater than 2, preferably greater than about 25, and more preferably, from about 100 to about 500; the polyorganosiloxane containing an average of at least one R group which contains an acryloxy or methacryloxy group, namely, $$CH_2=C(X)C(O)-O-$$

wherein X is hydrogen or alkyl such as methyl. The substituents represented by R in Formula (VI) include, for example, monovalent aliphatic groups such as methyl, ethyl, propyl, hexyl, etc.; monovalent cycloaliphatic groups such as cyclohexyl, cyclopentyl, etc.; aryl groups such as phenyl, methylphenyl, benzyl, etc.; alkenyl groups such as vinyl, allyl, 3-butenyl, etc. Examples of R groups which are substituted hydrocarbon groups include pentachlorophenyl, aminomethyl, 3-aminopropyl, etc.

Each acryloxy or methacryloxy group is attached to the siloxane backbone through a carbon-to-silicon bond or a carbon-oxygen-silicon bond. More often, there are present an average of from about 2 to about 25, more preferably from about 2 to about 10 of the R groups containing an acryloxy or methacryloxy group. Alternatively, the polyorganosiloxane compounds containing acryloxy and/or methacryloxy groups useful in the present invention may be defined as containing from about 3% to about 75% by weight of acryloxy or methacryloxy groups, more often from about 3% to about 50% by weight of the acryloxy or methacryloxy groups.

Typically, the R groups in Formula (VI) have a structure as represented by Formula (VII):

$$CH_2=C(X)C(O)-O-R^6- \qquad (VII)$$

wherein $R^6$ is a divalent hydrocarbyl group of from 1 to about 15 carbon atoms or an oxyalkylene group containing from 1 to about 4 carbon atoms in the alkylene moiety and X is as described above.

The siloxanes containing the acryloxy or methacryloxy groups of Formula (VII) can be prepared, for example, by reacting a siloxane containing hydroxyl groups or epoxy groups with acrylic acid or methacrylic acid. The siloxanes containing hydroxyl groups may be prepared by reacting a reactive siloxane (e.g., containing halogen) with a polyhydroxy compound such as ethylene glycol, propylene glycol, glycerol or pentaerythritol.

The polyorganosiloxanes described above may be linear or branched. As will be recognized by those skilled in the art, the polyorganosiloxanes of Formula (VII) will also have an appropriate number of end-capping units, $R_3S_1O-$ at the terminals of the molecule where R is as previously defined.

The disclosures of U.S. Pat. Nos. 3,878,263; 4,064,286; 4,301,268; 4,306,050; 4,908,274; 4,963,438; 4,978,726; and 5,034,491 are hereby incorporated by reference for their disclosure of acrylate or methacrylate containing polyorganosiloxanes and methods of preparing polyorganosiloxanes containing acryloxy and/or methacryloxy groups useful in the present invention.

Polyorganosiloxanes containing acryloxy and/or methacryloxy groups are available commercially from, for example, Goldschmidt Chemical Corp., Hopewell, Va. Goldschmidt's silicone acrylate series include dimethylpolysiloxanes available under the general trade designation Tergo® RC, and more particularly, under designations such as RC 450, RC 450N, RC 706, RC 707, RC 710, RC 720 and RC 726. Some of these polysiloxanes are of the type prepared by the reaction of acrylic acid or methacrylic acid with dimethylpolysiloxane containing hydroxyl groups or epoxy groups.

In another embodiment, the curable silicone polymer comprises a mixture of at least two classes of materials: (i) an organopolysiloxane containing acryloxy or methacryloxy groups described above, and (ii) acrylated or methacrylated organic polyhydroxy compounds or polyamino compounds. Any acrylated and methacrylated organic polyhydroxy and polyamino compounds can be used in combination with the above-described polysiloxanes.

The weight ratio of (i) organopolysiloxane to (ii) acrylated and methacrylated polyhydroxy and polyamino compounds may vary over a wide range. Thus, a mixture may comprise from about 2% by weight up to about 90% by weight of the polysiloxane and from about 10% to about 98% by weight of the acrylated or methacrylated polyhydroxy and/or polyamino compounds. The silicone polymers preferably comprise a mixture of more than one acrylated or methacrylated organic polyhydroxy compound or polyamino compound. Such mixtures may comprise two or more derivatives derived from polyhydroxy compounds, two or more compounds derived from polyamino compounds, mixtures of one or more compounds derived from a polyhydroxy compound and one or more compounds derived from a polyamino compound. Thus, in one embodiment, the mixture comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In yet another embodiment of the present invention, a portion of the acrylated or methacrylated compound may be replaced by a liquid monoacrylate ester. For example, from about 1% to about 20% by weight of the polyacrylate in the above mixtures may be replaced by a liquid monoacrylate ester to modify the properties of the curable silicone polymers. The liquid monoacrylate esters generally are characterized by a low viscosity such as from 1 to about 50 cps at 25° C., and these monoacrylate compounds are useful to improve the fluidity. Examples of such liquid monoacrylate esters include ethyl acrylate, butyl acrylate, 2-ethylhexyl acrylate, allyl acrylate, n-amyl acrylate, benzyl acrylate, cyclohexyl acrylate, diethylaminoethyl acrylate, 2-ethoxyethyl acrylate, n-lauryl acrylate, n-octyl acrylate, octadecyl acrylate, etc., the corresponding methacrylates and mixtures thereof.

The curable silicone polymers useful in the present invention optionally may contain at least one photoinitiator. The amount of photoinitiator included may range from about 0% to about 10%, more often from about 0.5% to about 5% based on the total weight of the curable composition. A photoinitiator is incorporated when the polymer is to be cured by exposure to non-ionizing radiation such as ultraviolet light. Photoinitiators are not required when the curable silicone polymer is cured by electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

Suitable polymerizable materials further include amino resins. The amino resins (sometimes referred to as aminoplast resins or polyalkylene amides) are nitrogen-rich polymers containing nitrogen in the amino form, —NH$_2$. The starting amino-bearing material is usually reacted with an aldehyde (e.g., formaldehyde) to form a reactive monomer, which is then polymerized to a thermosetting resin. Examples of amino-bearing materials include urea, melamine, copolymers of both with formaldehyde, thiourea, aniline, dicyanodiamide, toluene sulfonamide, benzoguanamine, ethylene urea and acrylamide. Preferred amino resins are the melamine-formaldehyde, melamine alkyl, and urea-formaldehyde resins.

Condensation products of other amines and amides can also be employed, for example, aldehyde condensates of triazines, diazines, triazoles, guanadines, guanamines and alkyl and aryl-substituted derivatives of such compounds including alkyl- and aryl-substituted ureas and alkyl- and aryl-substituted melamines. Some examples of such compounds are N,N'-dimethylurea, benzourea, dicyandiamide, 2-chloro-4,6-diamino-1,3,5-triazine and 3,5-diaminotriazole. Other examples of melamine and urea-based cross-linking resins include alkylated melamine resins including methylated melamine-formaldehyde resins such as hexamethoxymethyl melamine, alkoxymethyl melamines and ureas in which the alkoxy groups have 1 to about 4 carbon atoms such as methoxy, ethoxy, propoxy, or butoxymethyl melamines and dialkoxymethyl ureas; alkylol melamines and ureas such as hexamethylol melamine and dimethylol urea. The aminoplast cross-linking resins may be combined with another thermosetting resin such as an alkyl resin, a polyester resin, an epoxy resin or an acrylic resin.

Melamine resins which can be used include those which have been described as highly or partially methylated melamine-formaldehyde resins, high amino melamine-formaldehyde resins, mixed ether and butylated melamine-formaldehyde resins, etc.

The partially methylated melamine-formaldehyde resins generally contain a methoxymethyl-methylol functionality such as represented by Formula (VIII):

(VIII)

A series of such partially methylated melamine formaldehyde resins is available from American Cyanamid Company under the trade designations CYMEL 370, 373, 380 and 385 resins.

A series of highly methylated melamine resins containing a methoxy-methyl functionality as represented by Formula (IX):

(IX)

also is available from Cyanamid under the general trade designations Cymel 300, 301, 303 and 350 resins. The various resins in this series differ in their degree of alkylation and in monomer content. The monomer content in Cymel 300 is about 75%; in Cymel 301, about 70%; and Cymel 303, about 58%; and in Cymel 350, 68%.

High imino melamine resins contain methoxymethyl-imino functionalities such as may be represented by Formula (X):

(X)

A series of melamine-formaldehyde resins known as high imino resins are available from Cyanamid under the trade designations Cymel 323, 325 and 327.

Mixed ether and butylated melamine resins are available from Cyanamid under the general trade designations Cymel 1100 resins, and these contain an alkoxy methyl functionality as illustrated by Formula (XI):

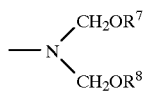
(XI)

wherein $R^7$ and $R^8$ are independently hydrocarbyl groups, for example alkyl groups such as methyl, ethyl, butyl or isobutyl groups, or preferably both $R^7$ and $R^8$ may be butyl groups.

Cymel 1158 resin is a melamine formaldehyde resin available from Cyanamid which contains butoxy-imino functionality as represented by Formula (XII):

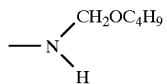
(XII)

Other useful amino resins available from Cyanamid under the CYMEL® designation include benzoguanamine-formaldehyde resins (CYMEL 1123 resin), glycoluril-formaldehyde resins (CYMEL 1170, 1171 and 1172) and carboxyl-modified amino resins (CYMEL 1141 and 1125).

Suitable polymerizable materials include polyamides. In particular, the polymerizable materials may be an aliphatic or aromatic polyamide resin. Polyamides are commercially available. Examples of polyamides include those under the trade designations Zytel available from DuPont, Capron from AlliedSignal, Texapol from Hanna, Ashlene from Ashley, Ultramid from BASF, Durethan from Bayer, Grilamid from EMS, Vestamid from Huls America, Vydyne from Monsanto, Wellamid from Wellman and others.

Generally speaking, polyamides can be prepared from dicarboxylic acids, diamines, amino acids and lactams. For example, the polyamide resins can be produced by condensation of equimolar amounts of a saturated dicarboxylic acid with a diamine. Alternatively, the dicarboxylic acids utilized to form nylons may be aromatic dicarboxylic acids such as isophthalic acid or terephtalic acid. Examples of aliphatic saturated dicarboxylic acids include sebacic, octadecanoic acid, sebacic acid, azelaic acid, undecanedoic acid, glutaric acid, pimelic acid and adipic acid.

Examples of diamines which can be reacted with dicarboxlyic acids to form nylons include diamines such as tetramethylenediamine, pentamethylenediamine, octamethylenediamine, decamethylenediamine, hexadecamethylenediamine and hexamethylenediamine. Examples of aromatic amines which can be utilized include para-phenylenediamine and 4,4'-diaminodiphenylsulfone. Polyamides can also be produced by the ring opening of lactams such as polycaprolactam, polybutyrolactam, polypivalolactam, polylauriclactam, poly-11-aminoundecanoic acid, bis(paraminocyclohexyl)methane dodecanoamide, etc.

Specific examples of polyamides include nylon 6 (polycaprolactam), nylon 6/6 (polyhexamethyleneadipamide), nylon 6/10 (condensation product of hexamethylenediamine and sebacic acid), nylon 6/12, nylon 6/T (polyhexamethylene terephthalamide), nylon 7 (polyenanthamide), nylon 8 (polycapryllactam), nylon 9 (polypelargonamide), nylon 10, nylon 11, nylon 12, nylon 55, nylon XD6 (poly metha-xylylene adipamide), nylon 6/1, polyβ-alanine, NOMAX® 410 available from DuPont, polyamides under the trade designations PA 7030 and 5050 available from Dow, and Ultramid K 1297/2 available from BASF.

Suitable polymerizable materials include polyimides. Polyimides can be prepared by reacting a diisocyanate with a dianhydride, or a dianhydride with an aromatic diamine (such as maleic anhydride and methylenedianiline). Examples of polyimides include KAPTON and VESPEL available from DuPont.

Suitable polymerizable materials include polyetherimides. Polyetherimides are polymers containing ether and imide linkages. For example, polyetherimides can be prepared by reacting at least one diamine, such as m-phenylenediamine or p-phenylenediamine, with at least one ether dianhydride, such as 2,2-bis[(3,4-dicarboxyphenoxy)phenyl]propane dianhydride. Polyetherimides are commercially available. Examples of polyetherimides include those under the trade designation ULTEM-1000, ULTEM-4000 and ULTEM-6000 from General Electric, RTP 2101, 2103 and 2105 from RTP and Thermofil W-10FG0100, W-20FG0100 and W-30FG0100 from Thermofil. Polyetherimides also include silicone polyetherimides.

Suitable polymerizable materials include polyphenylene sulfide resins. Polyphenylene sulfide resins may have the recurring units of Formula (XIII):

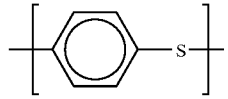

Polyphenylene sulfide resins can be prepared according to U.S. Pat. No. 3,354,129 which is hereby incorporated by reference. Polyphenylene sulfide resins are also commercially available. Examples of polyphenylene sulfide resins include those under the trade designation RYTON® available from Phillips Petroleum and Forton from Hoechst Celanese.

Suitable polymerizable materials include aromatic polysulfones. Aromatic polysulfones may have the recurring units of Formula (XIV):

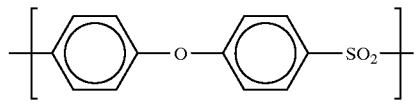

Aromatic polysulfones are commercially available. Examples of aromatic polysulfones include those under the trade designation VISTREX PES® available from ICI and UDEL POLYSULFONE® avaialble from Union Carbide.

Suitable polymerizable materials also include polyamide-imides. Polyamideimides may be prepared by condensing an imide and an amide. Polyamideimides are commercially available. Examples of polyamideimides include those under the trade designation TORLON™ available from Amoco and Lack E 3560/32 and 3561/27 available from Herberts Gmbh.

Suitable polymerizable materials include polyesterimides. Polyesterimdes are commercially available. Examples of polyesteramides include TERBEC® 533 L-33 available from BASF, IMIDEX-E available from General Electric and those made according to U.S. Pat. Nos. 3,426,098 and 3,697,471 which are herein incorporated by reference.

Suitable polymerizable materials include polyesteramide-imides. Polyesteramideimides are commercially available. Examples of polyesteramideimides include copolymers of any combination of a polyester, a polyamide and polyimide.

Unsaturated polyesters are preferred as are aromatic polyamides and polyimides.

Suitable polymerizable materials include polyvinyl acetals. Polyvinyl acetals are commercially available. Polyvinyl acetals include ethylene-vinyl acetate and copolymers of ethylene-vinyl acetate, especialy copolymers of ethylene-vinyl acetate and polyolefins.

Suitable polymerizable materials include fluorinated polymers. Fluorinated polymers are commercially available. Examples of fluorinated polymers include those under the trade designation TEFLON® available from DuPont (polytetrafluoroethylene PTFE), polyperfluoroalkyl vinyl ether (PFA), polyhexafluoropropylene, fluorinated ethylenepropylene polymers such as FEP® available from DuPont, and polyvinylidene fluoride.

Suitable polymerizable materials include polycarbonates. Polycarbonates can be prepared by the phosgenation of such as ethylene glycol, propylene glycol, and bisphenol A. Polycarbonates can alternatively be prepared by the base catalyzed transesterification of the dihydroxyaliphatic and aromatic monomers with a dialkyl or diaryl carbonate, such as diphenyl carbonate. Polycarbonates are commercially available. Examples of polycarbonates include those under the trade designation MAKROLON® available from Bayer, Naxell and Stanuloy from MRC Polymers, Calibre from Dow Plastics and Lexan from GE Plastics.

The polymerizable material may be initially used in combination with metal oxide sol to make a prepolymer mixture. The polymers according to the invention are made from a polymerizable material and a metal oxide sol, the prepolymer mixture.

In order to avoid undesirable premature polymerization of any of the polymerizable materials (resins) used with the inventive compositions, a small amount of a polymerization inhibitor can be used. Examples of such inhibitors include hydroquinone, tertiary butyl catechol, methyl ether of hydroquinone, and the like. These inhibitors should be incorporated in the mixture prior to reaction. An example of a commercially available inhibitor that can be used is SP-91029, which is a product of Plasticolors identified as a mixture of 2,6-di-tert-butyl-p-cresol (25%) and vinyl toluene (75%).

The following examples illustrate the preparation of polymerizable materials with which the metal oxide sols can be combined.

EXAMPLE A
UV-Curable Resin Mixture

A mixture of tris(2-hydroxyethyl)isocyanurate triacrylate (Sartomer SR368, 9.0 gm), urethane acrylate (Sartomer CN971 A80, 13.2 gm), bisphenol A ethoxylate (1 EO/phenol) diacrylate (Aldrich Chem., 60 gm), and isobornyl acrylate (Sartomer SR 506, 9.0 gm) in a brown glass bottle is stirred until a homogeneous solution is obtained. Subsequently, 2-isopropylthioxanthone photoinitiator (0.36 gm) and ethyl 4-dimethylaminobenzoate co-photoinitiator (1.08 gm) are added, and the resulting solution is further stirred giving a clear solution.

EXAMPLE B
UV-Curable Resin Mixture

A mixture of tris(2-hydroxyethyl)isocyanurate triacrylate (Sartomer SR386, 0.95 gm), urethane acrylate (Sartomer CNN699J25, 1.4 gm), and benzylmethacrylate (Aldrich Chem., 3.5 gm) is stirred in a brown glass bottle until a homogenous solution is obtained. Subsequently, the resin is mixed with 2-isopropyithioxanthone photoinitiator (0.066 gm) and ethyl 4-dimethylaminobenzoate co-photoinitiator (0.19 gm). The resulting mixture is further stirred giving a clear solution.

A "sol", as the term is used herein, refers to a composition comprising a liquid colloidal dispersion containing a liquid phase and a dispersed phase. The liquid phase of the liquid colloidal dispersion may be aqueous and/or organic, and in particular, may be at least one of water and organic liquids such as alcohols, glycols and other protic organic solvents. Organic solvents include methanol, ethanol, propanol, isopropanol, sec-butanol, t-butanol, methoxyethanol, ethoxyethoxyethanol, ethylene glycol and propylene glycol. The liquid phase may also be a liquid or partially liquid substance to which a metal oxide sol can be added such as resin monomers. For example, in the case where it is desired to incorporate metal oxide sols into a curable resin, the liquid phase of the metal oxide sols may be constituted by one embodiment of a polymerizable material such as curable resin monomers in liquid form.

The dispersed phase of the liquid colloidal dispersion comprises condensed partially hydrolyzed chetaled metal oxide precursors. The condensed partially hydrolyzed chetaled metal oxide precursors are micro-clusters which generally have an amorphous shape, although in some embodiments a somewhat symmetrical shape is obtained.

In one embodiment, the condensed partially hydrolyzed chelated metal oxide precursors have an average size (the size is the average diameter of a micro-cluster) of less than about 10 nm, preferably less than about 5 nm, and more preferably less than about 2 nm. It will be appreciated that some micro-clusters have a size larger than about 10 nm, as the average size refers to calculating the average of a random sample of micro-cluster diameters, each diameter to be averaged itself representing the average diameter of a generally amorphous micro-cluster in the random sample. The average size of a micro-cluster can be preferably determined with a transmission electron microscope, although an atomic force microscope can also be useful. If necessary, the size can be compared with conventional filler having a known size.

In general, a metal oxide sol can be produced by contacting a metal oxide precursor with a multifunctional compound, typically in a liquid solvent. The multifunctional compound contains at least one reactable functional group and at least one chelating functional group. The chelating functional group of the multifunctional compound coordinates with the metal oxide precursor to form a chelated metal oxide precursor. The chelated metal oxide precursor is hydrolyzed by a hydrolyzing agent, for example by contact with water, to provide a metal oxide sol.

Suitable metal oxide precursors are capable of being converted to a chelated metal oxide precursor by contact with a compound containing a chelating group. Metal oxide precursors include metal organic compounds and inorganic salts. Metal organic compounds include metal alkoxides and metal carboxylates. Metal alkoxides and metal carboxylates include metal methoxides, metal ethoxides, metal isopropoxides, metal propoxides, metal butoxides, metal ethylhexoxides, metal (triethanolaminato)isopropoxides, metal bis(ammonium lacto)dihydroxides, metal bis(ethyl acetoacetato)diisopropoxides, metal bis(2,4-pentanedionate) diisopropoxides, metal acetates, metal ethylhexanoates, metal gluconates, metal oxalates, metal propionates, metal pantothenates, metal cyclohexanebutyrates, metal trifluoroacetylacetonates, metal citrates, and metal methacrylates. Inorganic salts include metal halides and metal nitrates. In a preferred embodiment, the metal oxide precursor is a metal alkoxide.

The metal of the metal oxide precursors include transition metals, alkaline earth metals and metallic elements of Groups 3A, 4A and 5A of the periodic table of elements and combinations thereof. Transition metals include Sc, Ti, V, Cr, Mn, Fe, Co, Ni, Cu, Zn, Y, Zr, Nb, Mo, Tc, Ru, Rh, Pd, Ag, Cd, Ba, La, Hf, Ta, W, Re, Os, Ir, Pt, Au, Hg and Ac. Alkaline earth metals include Be, Mg, Ca, Sr and Ba. Group 3A metallic elements include B, Al, Ga, In and TI. Group 4A metallic elements include Ge, Sn and Pb. Group 5A metallic elements include As, Sb and Bi. In a preferred embodiment, the metal of the metal oxide precursors is at least one of aluminum, titanium and zirconium. In another preferred embodiment, the metal of the metal oxide precursors, metal organic compounds and inorganic salts is not silicon. In embodiments where two or more metals are present as the metal of the metal oxide precursors, metal organic compounds and inorganic salts, the first metal is one of those listed above and the second metal is preferably boron or silicon.

Metal oxide precursors include at least one of transition metal alkoxides, alkali metal alkoxides, alkaline earth metal alkoxides, Groups 3A, 4A and 5A alkoxides, transition metal carboxylates, alkali metal carboxylates, alkaline earth metal carboxylates, Groups 3A, 4A and 5A carboxylates, transition metal halides, alkali metal halides, alkaline earth metal halides, Groups 3A, 4A and 5A halides, transition metal nitrates, alkali metal nitrates, alkaline earth metal nitrates and Groups 3A, 4A and 5A nitrates. Preferred metal oxide precursors include metal organic compounds and inorganic salts of Groups 3A and 4B of the periodic table of elements such as aluminum alkoxides, aluminum halides, titanium alkoxides, titanium halides, zirconium alkoxides and zirconium halides.

Specific examples of metal oxide precursors include aluminum triethoxide, aluminum isopropoxide, aluminum sec-butoxide, aluminum tri-t-butoxide, aluminum lactate, aluminum nitrate, aluminum chloride, aluminum bromide, aluminum fluoride, aluminum iodide, calcium acetate, calcium ethylhexanoate, calcium gluconate, calcium oxalate, calcium propionate, calcium pantothenate, calcium cyclohexanebutyrate, calcium nitrate, calcium chloride, calcium bromide, calcium fluoride, calcium iodide, magnesium acetate, magnesium trifluoroacetylacetonate, magnesium methoxide, magnesium ethoxide, magnesium methylcarbonate, magnesium gluconate, magnesium nitrate, magnesium chloride, magnesium bromide, magnesium fluoride, magnesium iodide, tin acetate, tin oxalate, tin chloride, tin bromide, tin fluoride, tin iodide, tin bis (acetylacetonate)dibromide, tin bis(acetylacetonate) dichloride, titanium methoxide, titanium ethoxide, titanium isopropoxide, titanium propoxide, titanium butoxide, titanium ethylhexoxide, titanium (triethanolaminato) isopropoxide, titanium bis(ammonium lacto)dihydroxide, titanium bis(ethyl acetoacetato)diisopropoxide, titanium bis (2,4-pentanedionate)diisopropoxide, titanium chloride, titanium bromide, titanium fluoride, titanium iodide, zinc acetate, zinc methacrylate, zinc stearate, zinc cyclohexanebutyrate, zinc nitrate, zinc chloride, zinc bromide, zinc fluoride, zinc iodide, zirconium ethoxide, zirconium isopropoxide, zirconium propoxide, zirconium sec-butoxide, zirconium t-butoxide, zirconium acetate, zirconium citrate, zirconium chloride, zirconium bromide, zirconium fluoride, zirconium iodide, and combinations of two or more of the above compounds.

The following example illustrates the preparation of a metal oxide precursor.

EXAMPLE C
Preparation of Metal Oxide Precursor

A mixture of aluminum triisopropoxide (20.4 gm) and 2-methoxyethanol (76 gm) in a round bottle flask is heated to 90° C. for one hour to obtain a homogenous solution. Subsequently, part of the solvent (mainly isopropanol) is removed under vacuum to give a clear, low viscosity solution (54.5 gm), containing 46% aluminum trimethoxyethoxide.

The multifunctional compound is any compound capable of coordinating to a metal oxide precursor through a chelating functional group. The multifunctional compound which is contacted with the metal oxide precursors contains at least one reactable functional group and at least one chelating functional group. The chelating functional groups generally coordinate through nitrogen, oxygen, sulfur, phosphorus, arsenic and/or selenium atoms; thus chelating functional groups contain at least one of N, O, S, P, As and Se atoms. Chelating functional groups include polyphosphates, β-diketones, acetal acetates, aminocarboxylic acids, hydroxycarboxylic acids, hydroxyquinolines, polyamines, aminoalcohols, aromatic heterocylic bases, phenols, aminophenols, oximes, phosphonic acids, Schiff bases, tetrapyrroles, thiols, xanthates, and salicylic acid. The chelating functional groups coordinate to (react with) the metal of the metal oxide precursor in such a way to form a coordinated or chelated metal oxide complex that can prevent gelation of the sol by retarding, preventing or partially preventing hydrolysis and/or condensation.

The reactable functional group of the multifunctional compound does not substantially interact or bond with the metal oxide precursor. Instead, the reactable functional group interacts with a polymerizable material with which the metal oxide sols are subsequently combined. In other words, the reactable functional group is capable of reacting, interacting or bonding with a polymerizable material, a polymer or polymer substituent. The reactable functional group may be incorporated into the polymer backbone during polymerization, may be incorporated into the polymer during crosslinking, and/or may be incorporated into the polymer by reacting with a side chain, substituent group or a functional group on the polymer. For example, reactable functional groups include curable functional groups, photo-reactive functional groups, thermocurable groups, interactable groups, solvateable groups and condensable groups. Reactable functional groups include an acrylic unsaturated bond and other radiation curable aliphatically unsaturated functional groups, such as vinyl and acrylamide groups, styryl, acrylic, hydroxy, amine, carboxylic, thio, and phenol groups. Reactable functional groups can ensure good compatibility of the metal oxide sol with the polymerizable material with which the metal oxide sols are subsequently combined. The resulting combination of the metal oxide sol and the polymerizable material provides a polymer nanocomposite in which the partially hydrolyzed chelated metal oxide precursor is uniformly distributed in the resultant polymer at a molecular level.

In a few embodiments, especially when a relatively small amount or equivalents of the multifunctional compound (compared to the metal oxide precursor) is used, the reactable functional group may initially chelate with the metal oxide precursor; but once the partially hydrolyzed chelated metal oxide precursor or the micro-clusters are combined with the polymerizable material, the reactable functional group uncoordinates with the metal oxide precursor and reacts, interacts or bonds with the polymerizable material.

Multifunctional compounds are commercially available and/or can be prepared by reacting a compound containing a chelating functional group with a compound containing a reactive functional group. For example, a multifunctional compound can be prepared by reacting a compound containing a chelating functional group such as 4-aminosalicylic acid with a compound containing a reactive functional group such as methacryloylchloride to provide 4-methacryloylamino salicylic acid. In a preferred embodiment, the multifunctional compound is prepared by reacting a compound containing a chelating functional with a compound containing a reactive functional group such as a vinyl, an acrylic group or a hydroxyl group.

Specific multifunctional compounds which can be used in accordance with the invention include acrylic acid/maleic acid copolymer, alkoxylated diamines, alkyldiaminepolyacetic acids, aminoalkylphosphonic acid, amino tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/maleic acid copolymer, o-hydroxybenzoylacetone, 5-hydroxy-2-(hydroxymethyl)-4H-pyran-4-one, 3-hydroxy-2-methyl-4-pyrone, 8-hydroxyquinolone, N-hydroxyethylenediamine triacetic acid, hydroxyethylidene diphosphonic acid, hydroxyethane diphosphonic acid, nitrilotriacetic acid, sorbitol, tolyltrizole, o-hydroxybenzoylacetone, 2-hydroxydibenzoylmethane and N-(acetoacetyl)glycine.

Supplemental multifunctional compounds, which contain at least one of a reactable functional group and a chelating functional group, can optionally be used in addition to the multifunctional compound. Supplemental multifunctional compounds include polyacrylic acid, poly(ethylene glycol) methacrylate, and poly(propylene glycol) methacrylate. Supplemental multifunctional compounds are contacted with the metal oxide precursor just before, at the same time, or just after the multifunctional compound and the metal oxide precursor are combined.

The following example illustrates the preparation of a useful multifunctional compound.

EXAMPLE D
Preparation of a Multifunctional Compound

To a solution of purified toluene/diethyl ether (30 ml/30 ml), 4-aminosalicylic acid (6.58 gm, 43 mmole) is added in a glass vessel. After cooling to below 5° C. (in an ice/water bath), methacryloylchloride (5 gm, 43 mmole) is slowly added to the mixture while stirring. The resulting mixture is stirred for three hours, during which the temperature is allowed to increase gradually to room temperature. The solid fraction is collected by filtration and then washed several times with toluene/diethyl ether. The organic extracts are combined, washed with a small amount of water, and dried with $Na_2SO_4$. Removal of the solvent under vacuum gives a colorless solid (4.5 gm). FTIR of the solid confirms the formation of 4-(methacryloylamino)salicylic acid.

The metal oxide sol can be prepared in accordance with the following procedure. A metal oxide precursor is contacted with a multifunctional compound. In a preferred embodiment, the metal oxide precursor is provided in an appropriate amount of solvent, preferably in an organic solvent such as an alcohol or glycol solvent. In another preferred embodiment, the organic solvent optionally contains a small amount of water, for instance, about 0.01% to about 5% by weight of the organic solvent, and preferably about 0.1% to about 2% by weight of the organic solvent. In this embodiment, the metal oxide precursor is preferably a metal halide.

In another embodiment, the metal oxide precursor is provided in the polymerizable material in which the subsequently formed metal oxide sols will be incorporated. For example, if the metal oxide sols are to be incorporated into a curable resin system, the metal oxide precursor can be provided in the monomers of the uncured resin. The molar ratio of the amount of the metal oxide precursor combined with the multifunctional compound is from about 1:0.1 to about 1:3, preferably from about 1:0.2 to about 1:1.5, and more preferably from about 1:0.3 to about 1:1.2 (assuming the multifunctional compound contains a bidentate chelating functional group).

In one embodiment, when contacting the metal oxide precursor with a multifunctional compound, it is desirable for the multifunctional compound to coordinate with at least about 10% of the chelateable sites on the metal oxide precursor molecules (considering the number of chelateable sites on all of the metal oxide precursor molecules in a given reaction vessel). In another embodiment, it is desirable for the multifunctional compound to coordinate with at least about 25% of the chelateable sites. In yet another embodiment, it is desirable for the multifunctional compound to coordinate with at least about 50% of the chelateable sites. In still yet another embodiment, it is desirable for the multifunctional compound to coordinate with at least about 75% of the chelateable sites. The extent to which the multifunctional compound coordinates with the metal oxide precursor depends upon the relative amounts of the materials used, the number of chelateable sites on the metal oxide precursor molecules, and whether the multifunctional compound contains a bidentate, tridentate, etc., chelating functional group. NMR can be used to monitor the coordination of the metal oxide precursor.

The metal oxide precursor is contacted with a multifunctional compound at a temperature suitable to permit the multifunctional compound to coordinate with the metal oxide precursor. In one embodiment, the temperature is from about 0° C. to about 50° C., but preferably about room temperature. It is important to ensure that the chelating functional group of the multifunctional compound coordinates with the metal oxide precursor prior to partial hydrolyzation with a hydrolyzing agent such as water.

Subsequent to treatment with the chelating compound, the chelated metal oxide precursor is partially hydrolyzed by contact with a hydrolyzing agent. That is, unchelated atoms, groups or sites which are directly or indirectly connected to the metal atom of the chelated metal oxide precursor are hydrolyzed thereby providing a monomer of a partially hydrolyzed chelated metal oxide precursor. The chelated atoms or groups are generally not hydrolyzed, although a small fraction of the chelated groups may be hydrolyzed in some instances. So long as the percentage of chelated sites remains as described above, problems are not generally encountered. In one embodiment, the temperature at which the chelated metal oxide precursor is partially hydrolyzed is from about 0° C. to about 50° C., but preferably about room temperature.

Partial hydrolysis may be carried out by contacting the chelated metal oxide precursor with a hydrolyzing agent such as water, and preferably deionized water. The hydrolyzing agent converts the unchelated atoms or groups to hydroxyl groups. In one embodiment, the molar ratio of the chelated metal oxide precursor to water is about 1:0.5 to about 1:3, and preferably about 1:1 to about 1:2. In one embodiment, the chelated metal oxide precursor is contacted with a hydrolyzing agent in a solvent and preferably an organic solvent. In another embodiment, the chelated metal oxide precursor is contacted with a hydrolyzing agent in resin monomers and/or other ingredients. In this connection, the metal oxide sols can also be prepared in resin monomers without a solvent, or in the absence of a non-reactive element, such as a non-reactive diluent, as set forth in Example E below.

The partially hydrolyzed chelated metal oxide precursors are reactive monomers. Once formed, the monomers of the partially hydrolyzed chelated metal oxide precursor proceed to form the metal oxide sol of the invention by limited polycondensation. Since the monomers are partially chelated, the polycondensation is controlled whereby microclusters of several monomers are formed. That is, since polycondensation is controlled, the micro-clusters do not agglomerate and/or aggregate into gel form. Polycondensation may be controlled by varying the amount of hydrolyzing agent used and varying the percentage of chelated sites on the metal oxide precursor molecules.

On average, the oligomers constitute micro-clusters which may be made up of about 2 to about 5,000 partially hydrolyzed chelated metal oxide precursor monomers. In a preferred embodiment, the micro-clusters may be made up of about 3 to about 1,000 partially hydrolyzed chelated metal oxide precursor monomers. In a more preferred embodiment, the micro-clusters may be made up of about 4 to about 100 partially hydrolyzed chelated metal oxide precursor monomers. In an even more preferred embodiment, the micro-clusters may be made up of about 5 to about 25 partially hydrolyzed chelated metal oxide precursor monomers. The average number of monomers which constitute a given micro-cluster can be determined by considering at least one of a number of parameters including the average size of a micro-cluster, the identity of the atoms of the partially hydrolyzed chelated metal oxide precursor, the relative amounts of the micro-clusters of the partially hydrolyzed chelated metal oxide precursor and the liquid solvent (density), the length of time of the polycondensation reaction, the nature of the metal oxide precursor and the multifunctional compound, the extent (percentage) of coordination and the amount of hydrolyzing agent used.

The micro-clusters of the metal oxide sol may have an amorphous shape or a symmetrical shape. In this connection, the polycondensation reaction is a random polymerization. Thus, the micro-clusters may assume one or more of linear configuration, branched configuration, cluster configuration, dendrimer configuration, and cyclic configuration.

The resultant metal oxide sols are stable. Once made, the metal oxide sols can be stored as a colloidal dispersion for extended periods of time. It is believed that this is because the micro-clusters tend not to agglomerate. For example, in one embodiment, the metal oxide sols can be stored (colloidal dispersion maintained) for up to about 10 weeks, and in another embodiment, up to about 25 weeks at room temperature in a sealed container.

The following examples illustrate the preparation of useful metal oxide sols.

EXAMPLE E
Preparation of Metal Oxide Sol

A mixture of aluminum triisopropoxide (2.99 gm, 14.7 mmole) and 2-methoxyethanol (13 gm) is stirred at 90° C. until a clear solution is obtained.

After cooling to room temperature, 2-(methacryloyloxy) ethyl acetoacetate chelating agent (1.6 gm, 7.5 mmole) is first added to the solution and the resulting solution is stirred for 30 minutes before the addition of deionized water (0.26 gm, 14.7 mmole). The resulting mixture is further stirred for one hour to obtain a clear and stable metal oxide sol based on aluminum which shows no gel formation even after storage for three months.

Without using the multifunctional compound, the aluminum alkoxide solution quickly generates gelatinous white precipitate upon exposure to moisture.

EXAMPLE F
Preparation of Metal Oxide Sol

A mixture of aluminum triisobutoxide (1.56 gm, 6.3 mmole) and 2-propanol (3.8 gm) is stirred for ten minutes at room temperature. To the solution, 2-(methacryloyloxy) ethyl acetoacetate chelating agent (0.65 gm, 3 mmole) is added and the resulting solution is stirred for thirty minutes. The addition of deionized water (0.11 gm, 6.3 mmole), followed by stirring for one hour, gives a clear and stable metal oxide sol based on aluminum which shows no gel formation even after storage for three months.

Without the multifunctional compound, the aluminum alkoxide solution quickly generates gelatinous white precipitate upon exposure to moisture.

EXAMPLE G
Preparation of Metal Oxide Sol

To a solution of aluminum trisobutoxide (0.24 gm, 0.98 mmole) and 2-methoxyethanol (0.76 gm), 4-(methacryloylamino)sallcylic acid (0.19 gm, 0.92 mmole) is added and the solution is stirred for thirty minutes. The addition of deionized water (17 mg, 0.94 mmole) and stirring for one hour gives a clear and stable metal oxide sol based on aluminum.

EXAMPLE H
Preparation of Metal Oxide Sol

Hydroxyethyl salicylate (1.87 gm, 10 mmol) is added to a solution of aluminum tributoxide (4.12 gm, 17 mmol) and methoxyethanol (11.5 gm) and stirred for 30 minutes. To the solution, deionized water (0.47 gm, 26 mmol) is added and the resulting solution is stirred overnight to give a clear, stable metal oxide sol.

EXAMPLE I
Preparation of Metal Oxide Sol

Hydroxyethyl salicylamide (1.24 gm, 6.9 mmol) is added to a solution of aluminum tributoxide (4.123 gm, 17 mmol) and methoxyethanol (16 gm) and stirred for 30 minutes. To the solution, deionized water (0.47 gm, 26 mmol) is added and the resulting solution is stirred overnight to give a clear, stable metal oxide sol.

EXAMPLE J
Preparation of Metal Oxide Sol

Hydroxyethyl salicylate (0.753 gm, 4.1 mmol) is added to a solution of zirconium tetrapropoxide (3.353 gm, 10.2 mmol) and methoxyethanol (36 gm) and stirred for 30 minutes. To the solution, deionized water (0.37 gm, 20.4 mmol) in 2-methoxyethanol (2 gm) is added and the resulting solution is stirred overnight to obtain a clear, stable metal oxide sol.

EXAMPLE K
Preparation of Metal Oxide Sol

To a solution of titanium tetrapropoxide (49.72 gm, 0.175 mole) and methoxyethanol, methoxyethanol (28.4 gm) in a glass vessel, 3-hydroxy-2-methyl-4-pyrone (14.5 gm, 0.115 mole) is added and the resulting solution is stirred overnight to obtain a clear, stable metal oxide sol.

EXAMPLE L
Preparation of Metal Oxide Sol

3-Hydroxy-2-methyl-4-pyrone (5.49 gm, 0.079 mol) is added to a solution of aluminum tributoxide (21.46 gm, 0.147 mol) in a 2-methoxyethanol (45 gm) and stirred for 30 minutes. To the solution, deionized water (2.96 gm, 0.164 mol) in methoxyethanol is added and the resulting solution is stirred overnight to obtain a clear, stable metal oxide sol. The sol is stable and no gelation is observed even after storage for six months at room temperature.

EXAMPLE M
Preparation of Metal Oxide Sol

A mixture of N(acetocetyl)glycine (3.18 gm, 20 mmol) and butyl glycidyl ether (2.6 gm, 20 mmol) in methoxyethanol (1.5 gm) is stirred at 80° C. for 5 hrs to form a corresponding glycine ester having a hydroxy group. The above mixture (1.32 gm) is then added to a solution containing aluminum tributoxide (2.57 gm, 10.4 mmol) and methoxyethanol (10 gm) and the resulting solution is stirred for 30 minutes. To the mixture, a solution of deionized water (0.37 gm, 20.4 mmol)/methoxyethanol (0.3 gm) is added and the resulting mixture is stirred overnight to generate a metal oxide sol based on aluminum.

EXAMPLE N
Preparation of Metal Oxide Sol

A homogeneous mixture of aluminum tributoxide (0.37 gm, 1.5 mmol) and bisphenol A ethoxylate (2EO/PhOH) (0.3 gm) is prepared in a vial. Subsequently, 3-Hydroxy-2-methyl-4-pyrone (0.066 gm, 0.53 mmol) is added and the resulting mixture is stirred for 30 minutes. After addition of deionized water (0.04 gm, 2.3 mmol), the resulting mixture is stirred overnight and then heated to 80° C. under vacuum giving a metal oxide sol as a viscous clear liquid.

EXAMPLE O
Preparation of Metal Oxide Sol o-Hydroxybenzoylacetone (0.62 gm, 3.5 mmol) is added to a solution of zirconium tetrabutoxide (3.84 gm, 10 mmol) in methoxyethanol (5 gm) and the solution is stirred for 30 minutes. To the solution, deionized water (0.036 gm, 20 mmol) in methoxyethanol (1 gm) is added while stirring and the resulting solution is stirred overnight to give a clear sol. To the sol, bisphenol A bis diethylene glycol (4.2 gm) is added and the mixture is slowly heated to 80 ° C. under vacuum to remove volatile components. The resulting metal oxide sol based on zirconium is yellow; but clear viscous liquid (6.0 gm).

EXAMPLE P
Preparation of Metal Oxide Sol

A solution containing aluminum tributoxide (2.46 gm, 10 mmol) and tetraethyl orthosilicate (2.08 gm, 10 mmol) is prepared in methoxyethanol (50 gm). To the solution, 3-Hydroxy-2-methyl-4-pyrone (0.5 gm, 4 mmol) is added and the resulting solution is stirred for 30 minutes. To the solution, water (0.63 gm, 35 mmol) in methoxyethanol (1.5 gm) is added and the solution is stirred overnight to generate a clear stable metal oxide sol based on aluminum and silicon.

The metal oxide sol, and particularly the micro-clusters, may be combined with a polymerizable material up to about 70% by weight of the total composition. In one preferable embodiment, at least about 0.1% by weight of the total composition is the metal oxide sol, and more preferably from about 0.5% to about 40% by weight of the total composition is a metal oxide sol. The amount of metal oxide sol used with a particular polymerizable material is determined by processability and performance of the prepolymer mixture and the resultant polymer made with the metal oxide sol by viscosity requirements, by mechanical, electrical and thermal properties, and by other concerns. The maximum amount used may be determined, however, in a practical respect by the desired mechanical parameters of the resultant polymer. In one embodiemnt, the amount of polymerizable material which may be combined with a metal oxide sol to make a prepolymer mixture is from about 30% to about 99.9% by weight. In another embodiemnt, the amount of polymerizable material which may be combined with a metal oxide sol to make a prepolymer mixture is from about 60% to about 99.5% by weight.

Other ingredients which may be dispersed into the inventive compositions prior to or after polymerization and/or curing include one or more of the following: fillers, fibrous reinforcing materials, pigments, mold release agents, thermoplastic and elastomeric polymeric materials, shrink control agents, wetting agents, antifoam agents and thickeners.

In most embodiments, the metal oxide sol is simply combined with a polymerizable material, and optionally various other ingredients, to form a prepolymer mixture, the prepolymer mixture is then polymerized, cured heated or cooled to form the polymers of the present invention. In embodiments involving a thermosetting resin, the metal oxide sol is combined with the thermosetting resin prior to curing. The prepolymer mixture of the thermosetting resin and the metal oxide sol is preferably mixed followed by curing (polymerization and/or crosslinking). In some embodiments, the thermosetting resin can be B-staged (partially cured) before it is combined with the metal oxide sol to form a prepolymer mixture. Curing is accomplished in any manner consistent with the particular characteristics of the thermosetting resin. For example, curing may be initiated light such as UV light or visible light, a change in temperature such as heating or cooling, exposure to a curing initiator such as oxygen, or any other means known to those skilled in the art.

In any of these embodiments, the liquid phase of the metal oxide sol can be removed from a prepolymer mixture prior to curing. In another embodiment, the liquid phase of the metal oxide sol can be removed before mixing the sol with the polymerizable material. In yet another embodiment, the liquid phase of the metal oxide sol may be removed subsequent to curing, polymerization or heating the prepolymer mixture.

In embodiments where the polymerizable material is a thermoplastic resin, the metal oxide sol is combined with the thermoplastic resin prior to polymerization or after polymerization of the resin but when the thermoplastic resin is in condition to be combined with the metal oxide sol to form a prepolymer mixture. For example, in embodiments where a thermoplastic resin is polymerized, the metal oxide sol is combined with the resin after the thermoplastic resin is heated so that it is in the molten state or the liquid state. In this embodiment, the polymer according to the present invention is made by simply cooling the prepolymer mixture of the molten or liquid thermoplastic resin and the metal oxide sol. In another embodiment, the metal oxide sol is combined with the thermoplastic resin (prior to polymerization) to form a prepolymer mixture and then the prepolymer mixture is polymerized to form the polymer of the present invention. In any of these embodiments, the liquid phase of the metal oxide sol may be removed prior to polymerization, heating and/or cooling (such as by evaporation), prior to combining the metal oxide sol and thermoplastic resin, or after polymerization, heating and/or cooling.

The micro-clusters of the metal oxide sols mix homogeneously with the polymerizable material in which they are incorporated. Such a clear composition can be transparent to a photocure source regardless of thickness, and not susceptible to metal oxide precipitation as are conventional photocurable resins containing metal oxide fillers.

When the metal oxide sol is combined with a polymerizable material, high shear mixing is not required to produce a homogeneous composition. In some embodiments where the metal oxide sol is added to a polymerizable material, a transparent composition is obtainable. The fact that the metal oxide sol is used in the sol form has an added benefit in that it is not necessary to use organic solvents.

The prepolymer mixtures containing the polymerizable materials and the micro-clusters (made with metal oxide sols) may be processed using conventional techniques associated with processing the polymerizable material. For example, when the prepolymer mixture is a particular curable resin system containing the micro-clusters, the prepolymer mixture is cured and processed in a conventional manner associated with the particular curable resin system.

It is speculated that the micro-clusters of the metal oxide sols bond or interact with the polymerizable material via the reactable functional group of the multifunctional compound used to make the polycondensed partially hydrolyzed chelated metal oxide precursor during polymerization, curing, heating and/or cooling (or participate in the polymerization of the polymerizable material) thereby becoming a part of and dispersed within the resultant polymer on the molecular level. Again, while not wishing to be bound by any specific mechanism or theory, in particular, it is believed that the polycondensed partially hydrolyzed chelated metal oxide precursor may be incorporated into the polymer backbone, attached as a pendent group to the polymer, incorporated as a crosslinking group, or somehow bonded uniformly to the resultant polymer.

In some embodiments, polymerization, curing, heating and/or cooling need not occur immediately after the metal oxide sol is combined with the polymerizable material to form the prepolymer mixture. The prepolymer mixture of the metal oxide sol and the polymerizable material may be stored until it is needed or ready for use. In embodiments where the polymer according to the present invention is used as a coating, storage capabilities are desirable.

The polymers according to the present invention may have one or more of numerous desirable properties. Desirable properties include abrasion resistence, adhesion enhancement, chemical attack resistance, corona resistance (for example, due to high field intensities), high metal content, homogeneity, mechanical strength, oxide erosion resistance, plasma etch resistance, prevention of void formation, and resistance to monoatomic oxygen attack.

While not wishing to be bound by any specific mechanism or theory, it is speculated that the polymer made with the metal oxide sols described herein may be substantially void free. By "void free" it is meant that the polymer is pinhole-free, lacking holes or other fissures on the surface or in the volume thereof. In one embodiment, substantially void free indicates that a polymer containing the micro-clusters is more than about 99% pinhole-free. In another embodiment, substantially void free indicates that a polymer containing the micro-clusters is more than about 99.5% pinhole-free. In yet another embodiment, substantially void free indicates that a polymer containing the micro-clusters is more than about 99.9% pinhole-free.

The polymers containing the micro-clusters may also be characterized by their homogenous nature. Given the size of the micro-clusters and the tendency not to agglomerate, a homogenous mixture with a polymerizable material is easy to achieve. The term "transparent" as used herein with relation to the resulting polymer refers to the homogeneity of the polymer at the molecular level. In some embodiments, the polymer is ideally suitable for photocure processing due to its potential transparency.

Another advantage associated with using polymers made with metal oxide sols is the capability to make a very thin polymer substrate or coating. This is due to the lack of particulate matter in the resulting polymer. Alternatively, thick polymer substrates or coatings are easily achieved due to the transparent nature of the initial prepolymer mixture which greatly enhances the ease of curing and/or polymerizing the polymerizable material. Yet another advantage associated with using polymers made with metal oxide sols is the capability to maximize the amount of metal in a polymer.

The polymers made with metal oxide sols have resistance to attack from plasma such as oxygen plasma. The polymers made with metal oxide sols are stable in a plasma environment, which is a very severe and potentially damaging environment. Accordingly, the present invention also relates to methods of increasing the oxygen plasma resistance of polymers by using the metal oxide sols described herein. As a result, the polymers made with metal oxide sols are useful in electrical devices, such as microelectronic materials, especially those involved with plasma etching, cleaning, de-scumming, stripping and passivating of microelectronic materials.

The polymer made with metal oxide sols has excellent electrical and thermal insulation characteristics. In particular, the polymer according to the invention is corona resistant. Accordingly, the present invention also relates to methods of increasing the corona resistance of polymers by using the metal oxide sols described herein. The polymer also has desirable mechanical characteristics. As a result, the polymer is desirable for use in coating components of electrical devices. These devices encounter considerable electrical stress and their performance and life are substantially enhanced by the use of a corona resistant polymer coating.

In one embodiment, the prepolymer mixture containing a thermosetting resin, metal oxide sol and a photosenstizer is applied to a substrate by any of a number of known coating techniques, which include but are not limited to spin coating, dip coating, spray coating, electrical components coating, die coating, and bar coating. The viscosity of the prepolymer mixture need only be in the coatable range to afford the use of this wide array of coating techniques.

The coated substrate is then exposed in a conventional manner to a photocuring source. Whether the photocure is by UV or visible light depends on the photosensitizer used in the prepolymer mixture. Because the prepolymer mixture is transparent and readily transmits the irradiated light from the photocure source, the mixture easily achieves a complete, uniform cure. The thickness of the polymer coating is of little or no importance, other than as a matter of practical efficiency due to cost and end use, such as potential packing density which may be enhanced by the use of very thin coatings. The cured polymer coating is substantially transparent, as is the prepolymer mixture prior to the curing process.

Appreciable amounts of precipitates are not formed if the prepolymer mixture is stored. In other words, noticeable agglomeration of the micro-clusters does not generally occur. In one embodiment, the prepolymer mixture can be stored (colloidal dispersion maintained) for up to about 10 weeks, and in another embodiment, up to about 25 weeks at room temperature in a sealed container. Storage is preferably effected in a dry, dark, room temperature environment.

The following examples illustrate the process, prepolymer mixtures and polymers of the present invention. Unless otherwise indicated in the following examples and elsewhere in the specification and claims, all parts and percentages are by weight, all temperatures are in degrees Centigrade, and pressure is at or near atmospheric pressure.

Example 1
Polymer Made With Metal Oxide Sol

The metal oxide sol from Example E (17 gm) is charged into a flask and the volatiles are removed under vacuum to give a clear viscous residue (2.9 gm). To the residue, the Resin Mixture from Example A (5.62 gm), isobornyl acrylate (1.25 gm) and 2-methoxyethanol (2 gm) are added, and the resulting mixture is stirred to obtain a clear solution. The clear solution is applied onto a glass plate and UV-cured for one minute under $N_2$ using a BLAK-RAY UV Lamp B™ (UVP Corp., Upland, Calif.) forming a clear hard film having good adhesion to the substrate.

Example 2
Polymer Made With Metal Oxide Sol

A solution containing the aluminum trimethoxyethoxide solution from Example C (1 gm), isobornyl acrylate (3 gm), trimethylolpropane triacrylate (0.36 gm), 2-(methacryloyloxy)ethyl acetoacetate (0.34 gm), 2-isopropylthioxanthone photoinitiator (0.05 gm), and ethyl 4-dimethylaminobenzoate co-photoinitiator (0.14 gm) is stirred at room temperature for thirty minutes. After the addition of deionized water (0.03 gm), the resulting solution is further stirred for one hour. Removal of the volatiles under vacuum gives a clear solution (4.1 gm). The solution is bar-coated onto a glass plate and UV-cured for one minute under $N_2$ giving a clear, hard film with good adhesion to the substrate.

The identical solution without the 2-(methacryloyloxy) ethyl acetoacetate multifunctional compound is also prepared. In this case, however, the solution becomes opaque upon addition of water, and gradually generates a white precipitate. Attempts to form a clear uniform coating are unsuccessful due to the formation of gelatinous white precipitates during the application of the coating.

Example 3
Polymer Made With Metal Oxide Sol

To a homogenous solution containing isobornyl acrylate (3 gm), trimethylolpropane triacrylate (0.5 gm), and aluminum triisobutoxide (0.67 gm), 2-(methacryloyloxy)ethyl acetoacetate (0.54 gm) is added, and the resulting solution is stirred for thirty minutes at room temperature. After the addition of 2-isopropylthioxanthone photoinitiator (0.05 gm), ethyl 4-dimethylaminobenzoate co-photoinitiator (0.14 gm), and deionized water (0.05 gm), the resulting mixture is stirred at room temperature for one hour giving a clear solution. The clear solution is then applied to a glass plate and UV-cured for one minute under $N_2$ giving a clear and hard film, with good adhesion to the substrate.

Example 4
Polymers Made With Metal Oxide Sols

Three compositions Examples 4–1, 4–2 and 4–3, containing a metal oxide sol based on aluminum, shown in Table I, are prepared by:
(1) mixing the Resin Mixture prepared in Example A and the aluminum trimethoxyethoxide (ATME) solution prepared in Example C;

(2) adding 2-(methoacryloyloxy)ethyl acetoacetate (MEAA);
(3) stirring for thirty minutes;
(4) adding deionized water; and
(5) stirring for one hour.

The resulting solutions are clear and low in viscosity, and coatable by various techniques, including spin and spray coatings. No change in viscosity and clarity is observed, even after aging over three months at room temperature, in the dark. The compositions are cast onto glass plates and UV-cured for one minute under $N_2$ giving clear, hard films having good adhesion to the substrate.

TABLE I

POLYMERS CONTAINING METAL OXIDE SOL

| EXAMPLE | AMOUNT OF RESIN FROM EXAMPLE A | ATME SOLUTION FROM EXAMPLE C | MEAA | WATER |
|---|---|---|---|---|
| 4-1 | 3.9 gm | 1.1 gm | 0.27 gm | 0.04 gm |
| 4-2 | 3.4 gm | 2.67 gm | 0.55 gm | 0.09 gm |
| 4-3 | 2.0 gm | 3.3 gm | 0.40 gm | 0.11 gm |

Corona Resistance Testing

The compositions from Examples A, 4–1 and 4–2 are bar-coated at various levels on the polyimide surface of 3"×31" polyimide (76.2 μm)/adhesive (20.3 μm)/copper (107μm) laminates (GTS FLEXIBLE MATERIALS, INC., Warwick R.I.). The coated substrates are subsequently heated to 60°–80° C. and exposed to a BLAK-RAY UV Lamp Model B™ (UVP Corp., Upland, Calif.) for one minute under $N_2$. Test samples are also prepared by coating on a 3"×3" Cu plate having a thickness of 0.83 mm as described above. The cured films exhibited good adhesion to these substrates and no delamination is observed. The cured films are tested for corona resistance by a needle point corona resistance test which follows a modified ASTM D2275-80 test method. The electrode assembly for the test consists of a needle point electrode and plane arrangement with a 1 mm air gap between the electrode and the sample. The plane electrode comprises the test substrate/sample whether coated, uncoated, etc.

The test results set forth in Table II demonstrate the enhanced performance of the subject coating over the use of a conventional coating (Example A) or no coating, with respect to product life, i.e., time to coating failure due to corona attack.

TABLE II

RESULTS OF NEEDLE POINT CORONA RESISTANCE TESTING

| Composition Example | Sample Description (ATME + MEAA)/ Resin | Substrate | Coating Thickness (microns) | Applied Voltage (kV) | Time to Failure (hours) |
|---|---|---|---|---|---|
| no coating | | polyimide/copper | 0 | 5.2 | 11.6 |
| no coating | | polyimide/copper | 0 | 5.2 | 14.2 |
| A | 0 | polyimide/copper | 15 | 5.2 | 30.8 |
| A | 0 | polyimide/copper | 18 | 5.2 | 41.2 |
| 4-1 | 0.2 | polyimide/copper | 10 | 5.2 | 74.9 |

TABLE II-continued

RESULTS OF NEEDLE POINT CORONA RESISTANCE TESTING

| Composition Example | Sample Description (ATME + MEAA)/ Resin | Substrate | Coating Thickness (microns) | Applied Voltage (kV) | Time to Failure (hours) |
|---|---|---|---|---|---|
| 4-1 | 0.2 | polyimide/copper | 9 | 5.2 | 99.8 |
| 4-2 | 0.52 | polyimide/copper | 12 | 5.2 | 134.4 |
| 4-2 | 0.52 | polyimide/copper | 12 | 5.2 | 117.2 |
| 4-2 | 0.52 | polyimide/copper | 12 | 5.2 | 96.8 |
| A | 0 | copper | 99 | 5.2 | 25 |
| A | 0 | copper | 99 | 5.2 | 16.6 |
| 4-1 | 0.2 | copper | 99 | 5.2 | 315.4 |

Comparative Example 1
Polymer Without Multifunctional Compound

A composition identical to that of Example 4–2, but without the multifunctional compound is also prepared. In this case, however; the solution becomes opaque upon addition of water and gradual precipitation of aluminum oxide gel is observed. The same composition containing neither mutlifunctional compound nor water is also prepared. The solution, when applied onto a glass plate, quickly generates a white precipitate, resulting in the formation of a non-uniform opaque film.

Comparative Example 2
Polymer with 2.4-pentanedione

A composition comprising the Resin Mixture from Example A (1.0 gm), aluminum trimethoxyethoxide solution from Example C (1.6 gm), 2,4-pentane dione (0.28 gm), and water (0.05 gm) is prepared as described in Examples 1–3. The resulting solution is clear and low in viscosity. The solution, although clear before UV exposure, becomes highly opaque during UV cure, indicating phase separation of the inorganic component due to the chelating agent not having any reactable functional groups.

Comparative Example 3
Polymer Made With Fumed Aluminum Oxide

To the Resin Mixture from Example A (1.76 gm), fumed aluminum oxide (Degussa aluminum oxide-C, 0.24 gm) is added in a glass bottle. Since the viscosity is too high to homogenize with a magnetic stirrer, 3-methacryloxypropyltrimethoxysilane coupling agent (0.04 gm) is added to the mixture. The viscosity of the resulting blend gradually lowers and the fumed $Al_2O_3$ completely disperses into the resin. The resin viscosity is further lowered by adding 2-methoxyethanol (0.5 gm). The resulting composition is highly opaque and is not suitable for UV cure application. Furthermore, the solution, when aged, tends to precipitate the filler.

Example 5
Polymer Made With Metal Oxide Sol

A composition containing the Resin from Example B (3.06 gm), the metal oxide precursor from Example C (1.75 gm), MEAA (0.43 gm), and deionized water (0.06 gm) is prepared as described in Examples 4–1 to 4–3. The resulting solution is clear and low in viscosity, and suitable for coating applications.

Corona Endurance Testing

The compositions from Examples B and 5 are bar-coated onto the polyimide surface of 3"×3" polyimide (76.2 $\mu$m)/adhesive (20.3 $\mu$m)/copper (107 $\mu$m) laminates (GTS FLEXIBLE MATERIALS INC, Warwick R.I.), and UV-cured giving clear hard films. The cured films exhibit good adhesion to the substrate and no delamination is observed. Corona endurance testing of the samples set forth in Table III demonstrates the enhanced performance of the subject coating over the use of a conventional coating (Example B) or no coating with respect to product life, i.e., time to coating failure due to corona attack.

TABLE III

RESULTS OF NEEDLE POINT CORONA RESISTANCE TESTING

| Coating Composition Example | Sample Description (ATME + MEAA)/ Resin | Substrate | Coating Thickness (microns) | Applied Voltage (kV) | Time to Failure (hours) |
|---|---|---|---|---|---|
| no coating | | polyimide/copper | 0 | 5.2 | 12.9 |
| B | 0 | polyimide/copper | 18 | 5.2 | 41.2 |
| 5 | 0.4 | polyimide/copper | 9 | 5.2 | 99.8 |

Example 6
Polymer Made With Metal Oxide Sol

The metal oxide sol of Example M is admixed with a 1:1 mixture of bisphenol F epoxy/bisphenol A epoxy (7.7 gm). Volatile components are then removed under vacuum. Subsequently, Anchor 1222 catalyst (from Air Products and Chemicals) (0.1 gm) and 8-hydroxyquinoline (0.3 gm) are added to form a clear resin composition. The resin composition is stable and no gelation is observed even after storage for six months at room temperature. The composition is coated on a glass plate and cured in an oven at 180° C. for 3 hrs to give a clear yellow film exhibiting good adhesion to the substrate.

Example 7
Polymer Made With Metal Oxide Sol

The metal oxide sol of Example N is admixed with bisphenol F epoxy (PY306, Ciba Ceigy, 0.43 gm), phenol novolac epoxy (PY307, Ciba Ceigy, 0.57 gm), and cresyl glycidyl ether (Ciba Ceigy, DY023, 0.11 gm), and (3-glycidoxypropyl)trimethoxysilane (0.02 gm). After forming a homogeneous solution, Anchor 1222 catalyst (0.05 gm) is added to generate a low viscosity clear epoxy resin composition containing a metal oxide sol. The resin composition is stable and no gelation is observed even after six months at room temperature. The composition is coated on a glass plate and heated to 180 ° C. for 3 hrs to give a clear film exhibiting good adhesion to the substrate.

Example 8
Polymer Made With Metal Oxide Sol

The metal oxide sol of Example O is admixed with bisphenol F epoxy (PY306, Ciba Ceigy, 4.3 gm), phenol novolac epoxy (PY307, Ciba Ceigy, 5.7 gm), and cresyl glycidyl ether (Ciba Ceigy, DY023, 1.1 gm), and (3-glycidoxypropyl)trimethoxysilane (0.06 gm). After forming a homogeneous solution, Anchor 1222 catalyst (0.5 gm) is added to generate a low viscosity epoxy resin composition containing a metal oxide sol based on zirconium. The resin composition is coated on a glass plate and heated to 180° C. for 3 hrs to give a clear film.

Preparation of Epoxy Resin Systems

Seven epoxy resin compositions are prepared as shown in Table IV. Four resin compositions (Examples 9–12) made with the metal oxide sol of Examples H–K, respectively. Comparative Example 4 is prepared as a control and is not made with a metal oxide additive. Comparative Examples 5 and 6 contain colloidal silica and fumed aluminum oxide, respectively. All of the compositions are prepared by mixing the epoxy, the diol, the silane, and the metal oxide additives to form homogeneous solutions and then volatile components are removed under vacuum. Finally, Anchor 1222 catalyst is added to generate low viscosity, solventless resin compositions. The resin compositions of Examples 9–12 are stable and no gelation is observed even after three months at room temperature. In the case of Comparative Example 6, a high shear mixer is used to disperse the filler before addition of the catalyst.

TABLE IV

EPOXY RESIN FORMULATIONS WT %

| EXAMPLE | C4 | 9 | 10 | 11 | 12 | C5 | C6 |
|---|---|---|---|---|---|---|---|
| Aralddite CY179 epoxy (1) | 4.4 | 4.4 | 4.4 | 4.4 | 4.4 | 4.4 | 4.4 |
| Bisphenol A diol (2) | 2 | 2 | 2 | 2 | 2 | 2 | 2 |
| Sol in Example H | | 9 | | | | | |
| Sol in Example I | | | 7.1 | | | | |
| Sol in Example J | | | | 14.8 | | | |
| Sol in Example K | | | | | 4.18 | | |
| IPA-ST (3) | | | | | | 1.2 | |
| Aluminum oxide C (4) | | | | | | | 0.27 |
| Silane (5) | 0.04 | 0.04 | 0.04 | 0.04 | 0.04 | 0.04 | 0.04 |
| Anchor 1222 (6) | 0.26 | 0.26 | 0.26 | 0.26 | 0.26 | 0.26 | 0.26 |

(1): 3′,4′-Epoxycyclohexylmethyl3,4-epoxycylohexanecarboxylate form Ciba Geigy
(2): Bisphenol A ethoxylate (2EO/PhOH) from Aldrich Chemical
(3): Colloidal silica (31%) in isopropanol from Nissan Chemical
(4): Fumed aluminum oxide from Degussa
(5): 2-(3,4-Epoxycyclohexyl)ethyltrimethoxysilane
(6): Catalyst from Air Products and Chemicals Corona Endurance Testing The epoxy resin compositions prepared in Examples 9–12 and Comparative Examples 4–6 are bar-coated on a polyimide surface of 3"×3" polyimide (76.2 mm)/adhesive (20.3 mm)/copper (107 mm) laminates (GTS FLEXIBLE MATERIALS INC., WARWICK, R.I.) and Copper plates (Cu thickness of 1.045 mm), respectively. The coatings are then cured in an oven at 80° C./1 hr and 180 ° C./3 hrs to give pinhole free coatings. All the cured films except Comparative Example 6 provide clear films. The cured films of Examples 9–12 exhibit good adhesion to the substrates and no delamination is observed. Corona testing is performed at room temperature using the needle point corona test. The air gap between the needle point electrode tip and the specimen is 1.0 mm and the applied voltage is 5.2 KV AC RAS. Corona endurance testing of the samples set forth in Table V demonstrated that the substantially enhanced performance of the compositions containing the inventive metal oxide sols over the use of conventional coatings (containing no metal oxide additive, commercial fumed silica or alumina) with respect to product life, i.e. time to coating failure due to corona attack. Transmission electron micrographs of cured films of the resin compositions containing the inventive metal oxide sols demonstrate a uniform dispersion of material that is substantially smaller than those of conventional fillers (such as fumed alumina and fumed silica). In some cases, TEMs show no formation of particles, indicating the molecular level dispersion of the inventive metal oxide sols in the polymer matrix.

TABLE V

RESULTS OF NEEDLE POINT CORONA TESTING

| EXAMPLE | ADDITIVE METAL WT % | SUBSTRATE | COATING THICKNESS MICRON | TIME TO FAILURE HOUR |
|---|---|---|---|---|
| C4 | none | Pl/Cu | 18 | 42 |
| 9 | Al, 3.0 | Pl/Cu | 13 | 414 |
| 10 | Al, 2.0 | Pl/Cu | 13 | 969 |
| 11 | Zr, 4.2 | Pl/Cu | 13 | 120 |
| 12 | Ti, 3.1 | Pl/Cu | 15 | 250 |
| C5 | Si, 2.4 | Pl/Cu | 23 | 96 |
| C6 | Al, 2.0 | Pl/Cu | 21 | 78 |
| C4 | none | Cu | 120 | 40 |
| 9 | Al, 3.0 | Cu | 120 | 223 |
| 10 | Al, 2.0 | Cu | 120 | 827 |

The polymers of the present invention can be used in virtually any application where conventional polymers are used. For example, the polymers of the present invention can be used in the plastics industry, semiconductor industry, aerospace industry, automotive industry and the like. Specific examples of the numerous applications of end uses of the polymers of the present invention include insulating materials, containers, aerospace composites, dielectric substrates, microelectronic devices, printed circuit boards, tubes, pipes, consumer goods, housing materials, etc.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A polymer prepared from a mixture comprising:
    a polymerization material; and
    a polycondensation product of a partially hydrolyzed chelated metal oxide precursor.

2. The polymer according to claim 1, wherein the polycondensation product comprises about 2 to about 5,000 monomers of the partially hydrolyzed chelated metal oxide precursor.

3. The polymer according to claim 1, wherein the partially hydrolyzed chelated metal oxide precursor comprises a metal and the metal comprises at least one of an alkaline earth metal, a transition metal or a Group 3A metal.

4. The polymer according to claim 1, wherein the partially hydrolyzed chelated metal oxide precursor comprises a metal and the metal comprises at least one of aluminum, calcium, magnesium, tin, titanium, zinc or zirconium.

5. The polymer according to claim 1, wherein the partially hydrolyzed chelated metal oxide precursor comprises a multifunctional compound containing at least one chelating group coordinated to at least one of an alkaline earth metal, a transition metal or a Group 3A metal.

6. The polymer according to claim 1, wherein the polycondensation product has an average diameter less than about 10 nm.

7. The polymer according to claim 1, wherein the polymerization material comprises at least one of an acrylic resin, an unsaturated polyester resin, a saturated polyester resin, an alkyl resin, a vinyl ester resin, a polyurethane resin, an epoxy resin, a phenol resin, an urea-aldehyde resin, a polyvinyl aromatic, a maleimide resin, a polyvinyl halide resin, a polyolefin, a polyorganosiloxane, an amino resin, a polyamide, a polyetherimide, a polyphenylene sulfide resin, an aromatic polysulfone, a polyamideimide, a polyesterimide, a polyesteramideimide, a polyvinyl acetal, a fluorinated polymer, or a polycarbonate.

8. A prepolymer mixture comprising:

a polymerization material; and a metal oxide sol comprising a liquid and a polycondensation product of a partially hydrolyzed chelated metal oxide precursor.

9. The prepolymer mixture according to claim 8, wherein the partially hydrolyzed chelated metal oxide precursor is made from a metal oxide precursor, and the metal oxide precursor comprises at least one of aluminum triethoxide, aluminum isopropoxide, aluminum sec-butoxide, aluminum tri-t-butoxide, aluminum lactate, aluminum chloride, aluminum bromide, titanium methoxide, titanium ethoxide, titanium isopropoxide, titanium propoxide, titanium butoxide, titanium ethylhexoxide, titanium (triethanolaminato) isopropoxide, titanium bis(ammonium lacto)dihydroxide, titanium bis(ethyl acetoacetato)diisopropoxide, titanium bis (2,4-pentanedionate)diisopropoxide, titanium chloride, titanium bromide, zirconium ethoxide, zirconium isopropoxide, zirconium propoxide, zirconium sec-butoxide, zirconium t-butoxide, zirconium acetate, zirconium citrate, zirconium chloride or zirconium bromide.

10. The prepolymer mixture according to claim 8, wherein the partially hydrolyzed chelated metal oxide precursor is made by contacting a metal oxide precursor with a multifunctional compound, the multifunctional compound comprising at least one of acrylic acid/maleic acid copolymer, alkoxylated diamines, alkyl-diaminepolyacetic acids, aminoalkylphosphonic acid, amino tris(methylene phosphonic acid), anthranilic acid, benzotriazole, citric acid, diethylenetriamine pentaacetic acid, diethylenetriamine penta(methylene phosphonic acid), ethylenediaminetetraacetic acid, gluconic acid, glucoheptonoic acid, hexamethylenediamine tetra(methylene phosphonic acid), lignosulfonic acids, 2-(methacryloyloxy)ethyl acetoacetate, 5-(methacryloyloxy)methyl salicylic acid, 4-methacryloylamino salicylic acid, hydroxyethyl salicylate, hydroxyethyl salicylamide, methylvinyl ether/ maleic acid copolymer, o-hydroxybenzoylacetone, 5-hydroxy-2-(hydroxymethyl)-4H-pyran-4-one, 3-hydroxy-2-methyl-4-pyrone, 8-hydroxyquinolone, N-hydroxyethylenediamine triacetic acid, hydroxyethylidene diphosphonic acid, hydroxyethane diphosphonic acid, nitrilotriacetic acid, sorbitol, tolyltrizole, o-hydroxybenzoylacetone, 2-hydroxydibenzoylmethane or N-(acetoacetyl)glycine.

11. The prepolymer mixture according to claim 8, wherein the partially hydrolyzed chelated metal oxide precursor comprises a metal and the metal comprises at least one of an alkaline earth metal, a transition metal or a Group 3A metal.

12. The prepolymer mixture according to claim 8, wherein the polymerization material comprises at least one of an acrylic resin, an unsaturated polyester resin, a saturated polyester resin, an alkyd resin, a vinyl ester resin, a polyurethane resin, an epoxy resin, a phenol resin, an urea-aldehyde resin, a polyvinyl aromatic, a maleimide resin, a polyvinyl halide resin, a polyolefin, a polyorganosiloxane, an amino resin, a polyamide, a polyetherimide, a polyphenylene sulfide resin, an aromatic polysulfone, a polyamideimide, a polyesterimide, a polyesteramideimide, a polyvinyl acetal, a fluorinated polymer, or a polycarbonate.

13. The prepolymer mixture according to claim 8, wherein the polymerization material comprises a thermosetting resin.

14. The prepolymer mixture according to claim 8 comprising:

from about 30% to about 99.9% by weight of the polymerization material; and from about 0.1 % to about 70% by weight of the metal oxide sol comprising the liquid and the polycondensation product of the partially hydrolyzed chelated metal oxide precursor.

15. A process for making a polymer comprising:

contacting a polymerization material with a metal oxide sol comprising a liquid and a polycondensation product of a partially hydrolyzed chelated metal oxide precursor to form a mixture; and at least one of polymerizing or curing the mixture.

16. The process according to claim 15, further comprising the step of removing said liquid from the mixture prior to the step of at least one of polymerizing or curing the mixture.

17. The process according to claim 15, further comprising the step of removing said liquid from the mixture after the step of at least one of polymerizing or curing the mixture.

18. The process according to claim 15, wherein the polycondensation product has an average diameter less than about 10 nm.

19. The process according to claim 15, wherein the polycondensation product comprises about 3 to about 1,000 monomers of the partially hydrolyzed chelated metal oxide precursor.

20. The process according to claim 15, wherein the metal oxide sol is made by a process comprising contacting a metal oxide precursor with a multifunctional compound in a liquid to provide a chelated metal oxide precursor;

contacting the chelated metal oxide precursor with a hydrolyzing agent to provide partially hydrolyzed chelated metal oxide precursor monomers; and permitting the partially hydrolyzed chelated metal oxide precursor monomers to polycondense thereby forming the metal oxide sol comprising the liquid and the polycondensation product of the partially hydrolyzed chelated metal oxide precursor.

21. The process according to claim 15, wherein the polymerization material comprises at least one of an acrylic resin, an unsaturated polyester resin, a saturated polyester resin, an alkyd resin, a vinyl ester resin, a polyurethane resin, an epoxy resin, a phenol resin, an urea-aldehyde resin, a polyvinyl aromatic, a maleimide resin, a polyvinyl halide resin, a polyolefin, a polyorganosiloxane, an amino resin, a polyamide, a polyetherimide, a polyphenylene sulfide resin, an aromatic polysulfone, a polyamideimide, a polyesterimide, a polyesteramideimide, a polyvinyl acetal, a fluorinated polymer, or a polycarbonate.

22. The process according to claim 15, wherein the partially hydrolyzed chelated metal oxide precursor comprises a multifunctional compound containing at least one chelating group coordinated to at least one of an alkaline earth metal, a transition metal or a Group 3A metal.

* * * * *